US012671656B2

(12) United States Patent
Clemm et al.

(10) Patent No.: US 12,671,656 B2
(45) Date of Patent: Jun. 30, 2026

(54) TOKEN-BASED NETWORKING DATA PLANE PROTOCOL AND TOKEN PROCESSING ENGINE

(71) Applicant: HUAWEI TECHNOLOGIES CO., LTD., Shenzhen (CN)

(72) Inventors: Alexander Clemm, Los Gatos, CA (US); Stewart Bryant, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 368 days.

(21) Appl. No.: 18/450,677

(22) Filed: Aug. 16, 2023

(65) Prior Publication Data

US 2023/0396545 A1 Dec. 7, 2023

Related U.S. Application Data

(63) Continuation of application No. PCT/US2021/041870, filed on Jul. 15, 2021.

(60) Provisional application No. 63/169,591, filed on Apr. 1, 2021, provisional application No. 63/156,587, filed on Mar. 4, 2021.

(51) Int. Cl.
*H04L 45/7453* (2022.01)
*H04L 69/22* (2022.01)

(52) U.S. Cl.
CPC .......... *H04L 45/7453* (2013.01); *H04L 69/22* (2013.01)

(58) Field of Classification Search
CPC ............................ H04L 45/7453; H04L 69/22
See application file for complete search history.

(56) References Cited

U.S. PATENT DOCUMENTS

| 2014/0280717 A1 | 9/2014 | Frost et al. | |
| 2016/0105414 A1* | 4/2016 | Bringer | H04L 9/3247 |
| | | | 713/168 |
| 2020/0322266 A1* | 10/2020 | Clad | G06F 21/57 |
| 2020/0322325 A1* | 10/2020 | Filsfils | H04L 63/20 |

OTHER PUBLICATIONS

Bryant, S., et al., "Token Cell Routing: A New Sub-IP Layer Protocol," 2021 17th International Conference on Network and Service Management (CNSM), Izmir, Turkey, 2021, pp. 153-159.
Rosen, et al., "Multiprotocol Label Switching Architecture," RFC 3031, Jan. 2001, 61 pages.
Deering, et al, "Internet Protocol, Version 6 (IPv6) Specification," STD 86, RFC 8200, Jul. 2017, 42 pages.
Bryant, et al, "Pseudowire Emulation Edge-to-Edge (PWE3) Control Word for Use over an MPLS PSN," RFC 4385, Feb. 2006, 12 pages.
Finn, et al., "Deterministic Network Architecture," RFC 8655, Oct. 2019, 38 pages.

(Continued)

*Primary Examiner* — Donald L Mills
(74) *Attorney, Agent, or Firm* — Conley Rose, P.C.

(57) ABSTRACT

A method of providing token security implemented by a network device in a network. The method includes encoding, into a signature mask, an identity of one or more token cells that have been signed; encoding, into the signature mask, an indication of which of the one or more token cells have been partially signed; and encoding, into the signature mask, an indication of which portion of the one or more partially signed token cells have been signed. A method of utilizing a scratchpad and a method of decomposing a contract clause are also disclosed.

16 Claims, 25 Drawing Sheets

300

320

302 304 306 308

312 314 316 318

(56)                References Cited

OTHER PUBLICATIONS

Varga, et al., "Deterministic Networking (DetNet) Data Plane: MPLS," RFC 8964, Jan. 2021, 27 pages.

Filsfils, et al., "Segment Routing Architecture," RFC 8402, Jul. 2018, 32 pages.

Li, et al., "A New Framework and Protocol for Future Networking Applications," ACM SIGCOMM Workshop on Networking for Emerging Applications and Technologies (NEAT), Budapest, Hungary, Aug. 2018, pp. 21-26.

Francois, et al., "BPP over P4: Exploring Frontiers and Limits in Programmable Packet Processing", IEEE Global Communications Conference, Dec. 2020, 7 pages.

Bosshart, et al., "P4: Programming protocol-independent packet processors," SIGCOMM Comput. Commun. Rev., vol. 44, No. 3, p. 87-95, Jul. 2014.

Brockners, et al., "Data Fields for In-situ OAM." Internet Draft draft-ietf-ippm-ioam-data-12, IETF, Feb. 2021, 89 pages.

Bryant, Ed., et al., "Pseudo Wire Emulation Edge-to-Edge (PWE3) Architecture", RFC 3985, Mar. 2005, 42 pages.

Clemm, A., T. Eckert: High-Precision Latency Forwarding over Packet-Programmable Networks. IEEE/IFIP Network Operations and Management Symposium (NOMS 2020), Budapest, Hungary / virtual, Apr. 2020, 8 pages.

Shand, et al., "IP Fast Reroute Framework", RFC 5714, Jan. 2010, 15 pages.

ITU-T FG-Net 2030: New services and capabilities for network 2030: description, technical gap and performance target analysis. FG-NET2030 document NET2030-O-027, 2019, 45 pages.

* cited by examiner

200

202     204     204     204

900

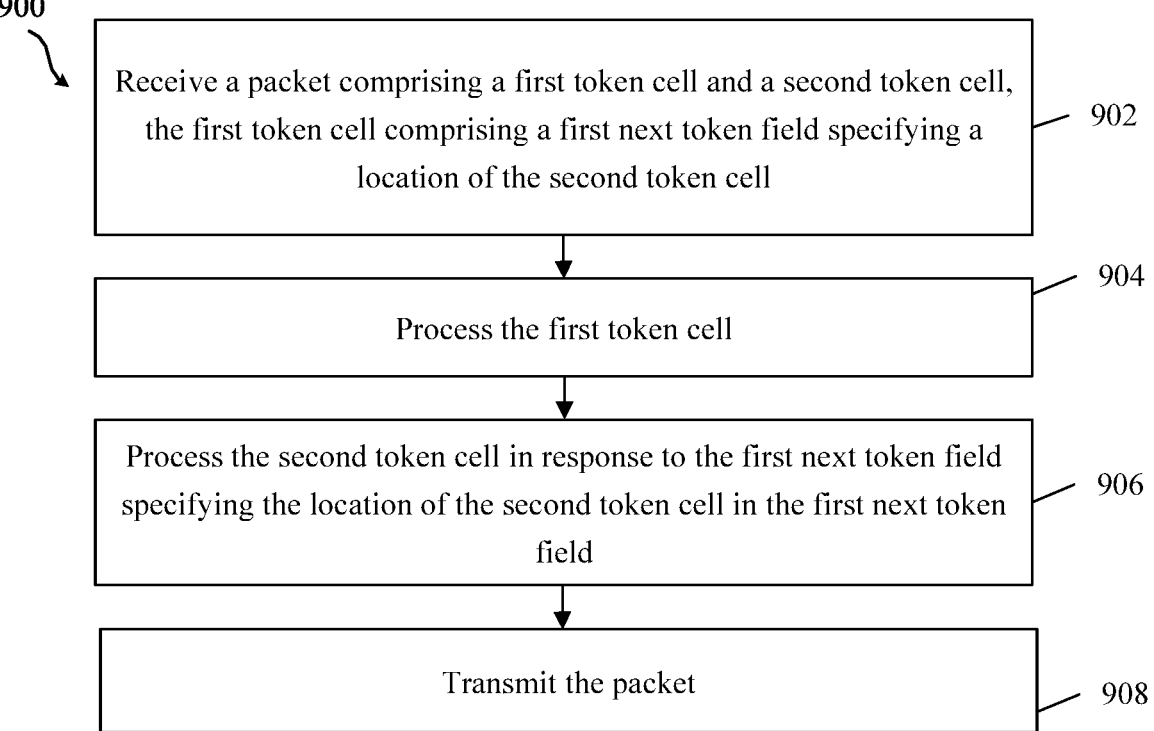

Receive a packet comprising a first token cell and a second token cell, the first token cell comprising a first next token field specifying a location of the second token cell          902

Process the first token cell          904

Process the second token cell in response to the first next token field specifying the location of the second token cell in the first next token field          906

Transmit the packet          908

Generate a packet comprising a first token cell and a second token cell, the first token cell comprising a first next token field specifying a location of the second token cell — 1002

Transmit the packet — 1004

1100

Receive a packet comprising a token cell, the token cell having a token cell type — 1102

Feed the token cell type of the token cell into a lookup engine to determine a code pointer, the code pointer specifying a location of code to be executed on the token cell — 1104

Execute the code at the location specified by the code pointer to generate a result — 1106

Store the result in a register — 1108

1300

Receive a packet comprising a header and a scratchpad, the header comprising a scratchpad pointer specifying a location of the scratchpad — 1302

Processing the header to generate writeable metadata — 1304

Store the writeable metadata in the scratchpad in response to the scratchpad pointer specifying the location of a scratchpad — 1306

Transmit the packet — 1308

1400

Generate a packet comprising a header and a scratchpad, the header comprising a scratchpad pointer specifying a location of the scratchpad — 1402

Transmit the packet — 1404

2100

2200

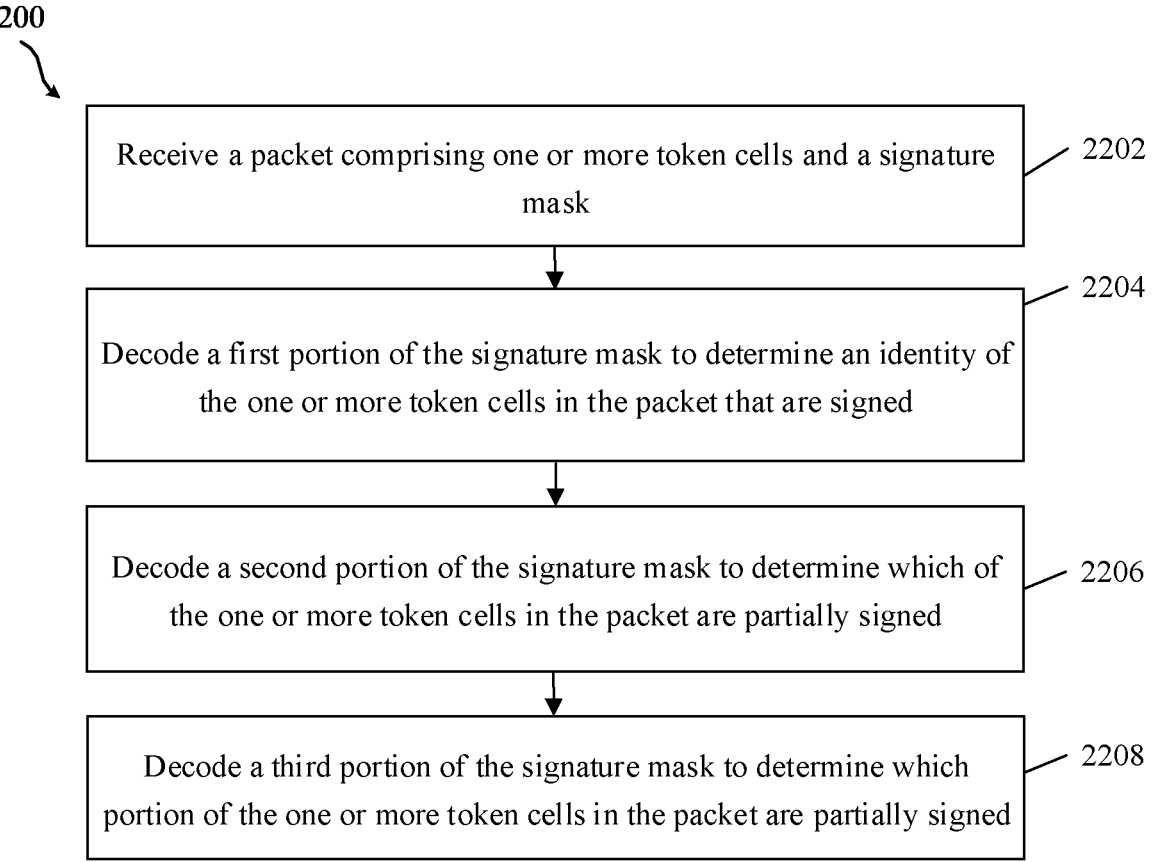

Receive a packet comprising one or more token cells and a signature mask — 2202

Decode a first portion of the signature mask to determine an identity of the one or more token cells in the packet that are signed — 2204

Decode a second portion of the signature mask to determine which of the one or more token cells in the packet are partially signed — 2206

Decode a third portion of the signature mask to determine which portion of the one or more token cells in the packet are partially signed — 2208

TOKEN-BASED NETWORKING DATA PLANE PROTOCOL AND TOKEN PROCESSING ENGINE

CROSS-REFERENCE TO RELATED APPLICATIONS

This patent application is a continuation of International Application No. PCT/US2021/041870 filed on Jul. 15, 2021, which claims the benefit of U.S. Provisional Patent Application No. 63/169,591 filed Apr. 1, 2021, and U.S. Provisional Patent Application No. 63/156,587 filed Mar. 4, 2021, each of which is hereby incorporated by reference.

TECHNICAL FIELD

The present disclosure is generally related to networking and, in particular, to a scratchpad, a signature mask, and a contract clause.

BACKGROUND

Advances in data plane protocols are needed to address new network requirements that stretch existing protocols (including Internet protocol version six (IPv6) and Segment Routing) to their limits.

SUMMARY

The disclosed aspects/embodiments provide a new sub-IP layer protocol referred to as token cell routing (TCR). TCR is based on token cells that provide a flexible method to describe required packet actions to the forwarder. As will be more fully explained below, token cells have a certain lightweight structure and programmable semantics. The token cells can be of different types, each associated with its own semantics and able to carry any parameters and data needed to correctly execute an action. The ability to compose packets from token cells results in a powerful mechanism that allows for the dynamic construction of packets with new network processing and forwarding semantics to meet the needs of new applications.

A first aspect relates to a method of header-based networking implemented by a network apparatus in a network, comprising: receiving a packet comprising a header and a scratchpad, the header comprising a scratchpad pointer specifying a location of the scratchpad; processing the header to generate writeable metadata; storing the writeable metadata in the scratchpad in response to the scratchpad pointer specifying the location of the scratchpad; and forwarding the packet.

Optionally, in any of the preceding aspects, another implementation of the aspect provides that the packet includes a second header disposed between the header and the scratchpad.

Optionally, in any of the preceding aspects, another implementation of the aspect provides that the packet includes a second header comprising a second scratchpad pointer specifying the location of the header.

Optionally, in any of the preceding aspects, another implementation of the aspect provides processing a second header; and referencing the writeable metadata stored in the scratchpad when processing the second header.

Optionally, in any of the preceding aspects, another implementation of the aspect provides that the packet comprises a second header comprising a second scratchpad pointer specifying a location of a second scratchpad storing additional writeable metadata, wherein the writeable metadata comprises a first set of telemetry data corresponding to a first segment of a path traversed by the packet, and wherein the additional writeable metadata comprises a second set of telemetry data corresponding to a second segment of the path traversed by the packet.

Optionally, in any of the preceding aspects, another implementation of the aspect provides that the packet comprises a second header comprising a second scratchpad pointer specifying a location of a second header storing additional writeable metadata, wherein the writeable metadata comprises a first set of telemetry data corresponding to an end-to-end (E2E) path traversed by the packet, and wherein the additional writeable metadata comprises a second set of telemetry data corresponding to a segment of the E2E path traversed by the packet.

Optionally, in any of the preceding aspects, another implementation of the aspect provides that the writeable metadata comprises in-band operations, administration, and maintenance (iOAM) data.

A second aspect relates to an apparatus in a network and configured to implement token-based networking, comprising: a memory storing instructions; and one or more processors coupled to the memory, and configured to: receive a packet comprising a header and a scratchpad, the header comprising a scratchpad pointer specifying a location of the scratchpad; process the header to generate writeable metadata; store the writeable metadata in the scratchpad in response to the scratchpad pointer specifying the location of the scratchpad; and forward the packet.

Optionally, in any of the preceding aspects, another implementation of the aspect provides that the packet includes a second header disposed between the header and the scratchpad token cell.

Optionally, in any of the preceding aspects, another implementation of the aspect provides that the packet includes a second header comprising a second scratchpad pointer specifying the location of the scratchpad.

Optionally, in any of the preceding aspects, another implementation of the aspect provides that the one or more processors are further configured to: process a second header; and reference the writeable metadata stored in the scratchpad when processing the second header.

Optionally, in any of the preceding aspects, another implementation of the aspect provides that the packet comprises a second header comprising a second scratchpad pointer specifying a location of a second scratchpad storing additional writeable metadata, wherein the writeable metadata comprises a first set of telemetry data corresponding to a first segment of a path traversed by the packet, and wherein the additional writeable metadata comprises a second set of telemetry data corresponding to a second segment of the path traversed by the packet.

Optionally, in any of the preceding aspects, another implementation of the aspect provides that the packet comprises a second header comprising a second scratchpad pointer specifying a location of a second scratchpad storing additional writeable metadata, wherein the writeable metadata comprises a first set of telemetry data corresponding to an end-to-end (E2E) path traversed by the packet, and wherein the additional writeable metadata comprises a second set of telemetry data corresponding to a segment of the E2E path traversed by the packet.

Optionally, in any of the preceding aspects, another implementation of the aspect provides that the writeable metadata comprises in-band operations, administration, and maintenance (iOAM) data.

A third aspect relates to a method of token-based networking implemented by a network apparatus in a network, comprising: generating a packet comprising a header and a scratchpad, the header comprising a scratchpad pointer specifying a location of the scratchpad configured to store writeable metadata in response to the header being processed; and transmitting the packet toward another network apparatus.

Optionally, in any of the preceding aspects, another implementation of the aspect provides that the packet includes a second header disposed between the header and the scratchpad.

Optionally, in any of the preceding aspects, another implementation of the aspect provides that the packet includes a second header comprising a second scratchpad pointer specifying the location of the scratchpad.

Optionally, in any of the preceding aspects, another implementation of the aspect provides that the packet comprises a second header comprising a second scratchpad pointer specifying a location of a second scratchpad storing additional writeable metadata, wherein the writeable metadata comprises a first set of telemetry data corresponding to a first segment of a path traversed by the packet, and wherein the additional writeable metadata comprises a second set of telemetry data corresponding to a second segment of the path traversed by the packet.

Optionally, in any of the preceding aspects, another implementation of the aspect provides that the packet comprises a second header comprising a second scratchpad pointer specifying a location of a second header storing additional writeable metadata, wherein the writeable metadata comprises a first set of telemetry data corresponding to an end-to-end (E2E) path traversed by the packet, and wherein the additional writeable metadata comprises a second set of telemetry data corresponding to a segment of the E2E path traversed by the packet.

Optionally, in any of the preceding aspects, another implementation of the aspect provides that the writeable metadata comprises in-band operations, administration, and maintenance (iOAM) data.

A fourth aspect relates to an apparatus in a network and configured to implement token-based networking, comprising: a memory storing instructions; and one or more processors coupled to the memory, and configured to: generate a packet comprising a header and a scratchpad, the header comprising a scratchpad pointer specifying a location of the scratchpad configured to store writeable metadata in response to the header being processed; and transmit the packet toward another network apparatus.

Optionally, in any of the preceding aspects, another implementation of the aspect provides that the packet includes a second header disposed between the header and the scratchpad.

Optionally, in any of the preceding aspects, another implementation of the aspect provides that the packet includes a second header comprising a second scratchpad pointer specifying the location of the scratchpad.

Optionally, in any of the preceding aspects, another implementation of the aspect provides that the packet comprises a second header comprising a second scratchpad pointer specifying a location of a second scratchpad storing additional writeable metadata, wherein the writeable metadata comprises a first set of telemetry data corresponding to a first segment of a path traversed by the packet, and wherein the additional writeable metadata comprises a second set of telemetry data corresponding to a second segment of the path traversed by the packet.

Optionally, in any of the preceding aspects, another implementation of the aspect provides that the packet comprises a second header comprising a second scratchpad pointer specifying a location of a second header storing additional writeable metadata, wherein the writeable metadata comprises a first set of telemetry data corresponding to an end-to-end (E2E) path traversed by the packet, and wherein the additional writeable metadata comprises a second set of telemetry data corresponding to a segment of the E2E path traversed by the packet.

Optionally, in any of the preceding aspects, another implementation of the aspect provides that the writeable metadata comprises in-band operations, administration, and maintenance (iOAM) data.

A fifth aspect relates to a method of providing token security implemented by a network device in a network, comprising: encoding, into a signature mask, an identity of one or more token cells that have been signed; encoding, into the signature mask, an indication of which of the one or more token cells have been partially signed; and encoding, into the signature mask, an indication of which portion of the one or more token cells have been partially signed.

Optionally, in any of the preceding aspects, another implementation of the aspect provides storing an identity of a network device generating the signature mask, the signature mask, and signature mask material in a security token cell, the signature mask material comprising a security type, a key identifier (ID), and a hash result.

Optionally, in any of the preceding aspects, another implementation of the aspect provides adding the security token cell to a packet, and transmitting the packet toward another network device.

Optionally, in any of the preceding aspects, another implementation of the aspect provides encoding a position indicator into the signature mask, the position indicator indicating whether a position of the one or more tokens is absolute or relative to a position of the security token cell.

Optionally, in any of the preceding aspects, another implementation of the aspect provides encoding the identity of the one or more token cells being signed into a first portion of the signature mask, and encoding a next indicator into the signature mask to indicate whether the signature mask contains a second portion containing one or more additional token cells being signed.

Optionally, in any of the preceding aspects, another implementation of the aspect provides that encoding the indication of which of the one or more token cells is being partially signed into a first portion of the signature mask, and encoding a next indicator into the signature mask to indicate whether the signature mask contains a second portion containing one or more additional token cells being partially signed.

Optionally, in any of the preceding aspects, another implementation of the aspect provides that the indication of which portion of the one or more token cells is being partially signed identifies one or more octets of the one or more token cells being partially signed.

Optionally, in any of the preceding aspects, another implementation of the aspect provides that the security token cell is added into the packet immediately following a preamble of the packet.

Optionally, in any of the preceding aspects, another implementation of the aspect provides that the security token cell is configured to secure a scratchpad token cell.

A sixth aspect relates to an apparatus in a network and configured to implement token-based networking, comprising: a memory storing instructions; and one or more processors coupled to the memory, and configured to: encode, into a signature mask, an identity of one or more token cells that have been signed; encode, into the signature mask, an indication of which of the one or more token cells have been partially signed; and encode, into the signature mask, an indication of which portion of the one or more token cells have been partially signed.

Optionally, in any of the preceding aspects, another implementation of the aspect provides that the one or more processors are further configured to store an identity of a network device generating the signature mask, the signature mask, and signature mask material in a security token cell, the signature mask material comprising a security type, a key identifier (ID), and a hash result.

Optionally, in any of the preceding aspects, another implementation of the aspect provides that the one or more processors are further configured to add the security token cell to a packet, and transmit the packet toward another network device.

Optionally, in any of the preceding aspects, another implementation of the aspect provides that the one or more processors are further configured to encode a position indicator into the signature mask, the position indicator indicating whether a position of the one or more tokens is absolute or relative to a position of the security token cell.

Optionally, in any of the preceding aspects, another implementation of the aspect provides that the one or more processors are further configured to encode the identity of the one or more token cells being signed into a portion of the signature mask, and encode a next indicator into the signature mask to indicate whether the signature mask contains a second portion containing one or more additional token cells being signed.

Optionally, in any of the preceding aspects, another implementation of the aspect provides that the one or more processors are further configured to encode the indication of which of the one or more token cells is being partially signed into a first portion of the signature mask, and encode a next indicator into the signature mask to indicate whether the signature mask contains a second portion containing one or more additional token cells being partially signed.

Optionally, in any of the preceding aspects, another implementation of the aspect provides that the indication of which portion of the one or more token cells is being partially signed identifies one or more octets of the one or more token cells is being partially signed.

Optionally, in any of the preceding aspects, another implementation of the aspect provides that the security token cell is added into the packet immediately following a preamble of the packet.

Optionally, in any of the preceding aspects, another implementation of the aspect provides that the security token cell is configured to secure a scratchpad token cell.

A seventh aspect relates to a method of providing token security implemented by a network device in a network, comprising: receiving a packet comprising one or more token cells and a signature mask; decoding a first segment of the signature mask to determine an identity of the one or more token cells in the packet that are signed; decoding a second segment of the signature mask to determine which of the one or more token cells in the packet are partially signed; decoding a third segment of the signature mask to determine which portion of the one or more token cells in the packet are partially signed; and verifying a signature of the one or more token cells according to the first segment, the second segment, and the third segment as decoded.

Optionally, in any of the preceding aspects, another implementation of the aspect provides that the packet further comprises a security token cell including an identity of a network device that generated the signature mask, the signature mask, and signature mask material, the signature mask material comprising a security type, a key identifier (ID), and a hash result.

Optionally, in any of the preceding aspects, another implementation of the aspect provides that the signature mask comprises a position indicator indicating whether a position of the one or more tokens is absolute or relative to a position of the security token cell.

Optionally, in any of the preceding aspects, another implementation of the aspect provides decoding the identity of the one or more token cells that are signed from a first portion of the signature mask, and decoding a next indicator from the signature mask to indicate whether the signature mask contains a second portion containing one or more additional token cells that are signed.

Optionally, in any of the preceding aspects, another implementation of the aspect provides decoding the indication of which of the one or more token cells that are partially signed from a first portion of the signature mask, and decoding a next indicator from the signature mask to indicate whether the signature mask contains a second portion containing one or more additional token cells that are partially signed.

Optionally, in any of the preceding aspects, another implementation of the aspect provides that the indication of which portion of the one or more token cells is being partially signed identifies one or more octets of the one or more token cells is being partially signed.

Optionally, in any of the preceding aspects, another implementation of the aspect provides that the security token cell immediately follows a preamble of the packet.

An eighth aspect relates to an apparatus in a network and configured to implement token-based networking, comprising: a memory storing instructions; and one or more processors coupled to the memory, and configured to: receive a packet comprising one or more token cells and a signature mask; decode a first segment of the signature mask to determine an identity of the one or more token cells in the packet that are signed; decode a second segment of the signature mask to determine which of the one or more token cells in the packet are partially signed; and decode a third segment of the signature mask to determine which portion of the one or more token cells in the packet are partially signed.

Optionally, in any of the preceding aspects, another implementation of the aspect provides that the packet further comprises a security token cell including an identity of a network device that generated the signature mask, the signature mask, and signature mask material, the signature mask material comprising a security type, a key identifier (ID), and a hash result.

Optionally, in any of the preceding aspects, another implementation of the aspect provides that the signature mask comprises a position indicator indicating whether a position of the one or more tokens is absolute or relative to a position of the security token cell.

Optionally, in any of the preceding aspects, another implementation of the aspect provides that the one or more processors are further configured to decode the identity of the one or more token cells that are signed from a first portion of the signature mask, and decode a next indicator from the signature mask to indicate whether the signature mask contains a second portion containing one or more additional token cells that are signed.

Optionally, in any of the preceding aspects, another implementation of the aspect provides that the one or more processors are further configured to decode the indication of which of the one or more token cells that are partially signed from a first portion of the signature mask, and decode a next indicator from the signature mask to indicate whether the signature mask contains a second portion containing one or more additional token cells that are partially signed.

Optionally, in any of the preceding aspects, another implementation of the aspect provides that the indication of which portion of the one or more token cells is being partially signed identifies one or more octets of the one or more token cells is being partially signed.

Optionally, in any of the preceding aspects, another implementation of the aspect provides that the security token cell immediately follows a preamble of the packet.

A ninth aspect relates to a method of packet processing implemented by a network device in a network, comprising: receiving a packet comprising one or more conditions and one or more directives in separate token cells in the packet; and processing one of the token cells comprising one of the conditions and in response further processing one of the token cells comprising one of the directives.

Optionally, in any of the preceding aspects, another implementation of the aspect provides processing one of the token cells comprising one of the directives that is not in response to first processing one of the token cells comprising one of the conditions.

Optionally, in any of the preceding aspects, another implementation of the aspect provides that the directives processed in response to the processing of one of the conditions comprise actions.

A tenth aspect relates to a method of decomposing a contract packet into token cells in a packet implemented by a network device in a network, comprising: decomposing the contract into one or more conditions and one or more directives performed based on a result of the one or more conditions; and encoding each of the one or more conditions and the one or more directives into separate token cells in the packet.

Optionally, in any of the preceding aspects, another implementation of the aspect provides encoding a manifest token cell into the packet, the manifest token cell comprising a list of token cell pointers specifying a location of the token cells to be processed in parallel, wherein each of the token cells to be processed in parallel includes one of the conditions or one of the directives.

Optionally, in any of the preceding aspects, another implementation of the aspect provides that the token cells in the packet comprise a first token cell and a second token cell, wherein the method further comprises encoding a rendezvous token cell into the packet, the rendezvous token cell configured to merge a first result of processing the first token cell and a second result of processing the second token cell, and wherein each of the first token cell and the second token cell includes one of the conditions.

Optionally, in any of the preceding aspects, another implementation of the aspect provides that the token cells in the packet comprise a first token cell and a second token cell, and wherein the first token cell includes a next token field specifying a location of the second token cell to be processed after the first token cell.

Optionally, in any of the preceding aspects, another implementation of the aspect provides that the first token cell includes one of the conditions, and wherein the second token cell includes one of the directives.

Optionally, in any of the preceding aspects, another implementation of the aspect provides partitioning the contract into one or more condition sets and one or more directive sets prior to partitioning the contract into the one or more conditions and the one or more directives.

Optionally, in any of the preceding aspects, another implementation of the aspect provides partitioning the contract into one or more conditional directives prior to partitioning the contract into the one or more condition sets and the one or more directive sets.

Optionally, in any of the preceding aspects, another implementation of the aspect provides that one of the token cells includes a next token field containing a null value, the null value signifying that no subsequent token to be processed is identified.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 9 is a method of token-based networking implemented by a network apparatus in a network.

FIG. 22 is a method of providing token security implemented by a network apparatus in a network.

DETAILED DESCRIPTION

Figure 1:
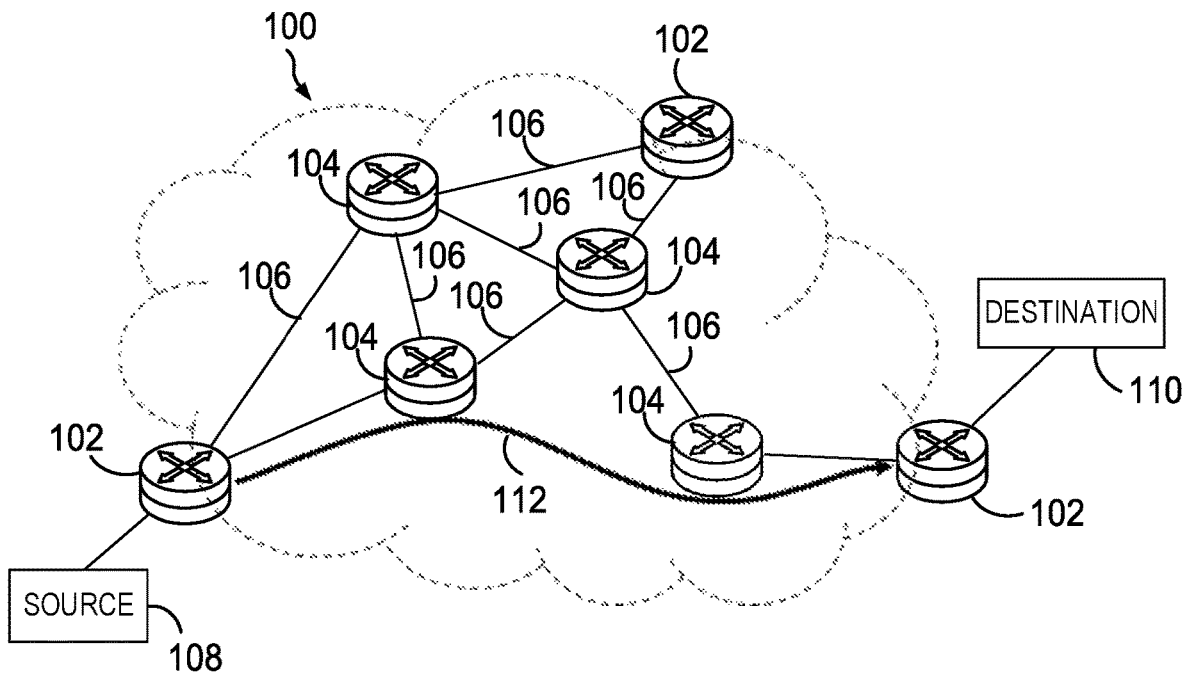
FIG. 1 illustrates an embodiment of a network configured to implement token cell routing (TCR).

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

New networking use cases call for greater service level awareness and adherence to stringent "high-precision" service level guarantees. Network providers and application developers demand greater programmability that provides them with the ability to exert greater control over packet forwarding behavior. Network optimization requires greater visibility into flow and packet telemetry.

Disclosed herein is a new sub-IP layer protocol referred to as token cell routing (TCR). TCR is based on token cells that provide a flexible method to describe required packet actions to the forwarder. As will be more fully explained below, token cells have a certain lightweight structure and programmable semantics. The token cells can be of different types, each associated with its own semantics and able to carry any parameters and data needed to correctly execute an action. The ability to compose packets from token cells results in a powerful mechanism that allows for the dynamic construction of packets with new network processing and forwarding semantics to meet the needs of new applications.

A beneficial feature of TCR is that TCR enables the expression of the interdependencies between token cells. This allows a packet to specify which token cells should be processed serially and which token cells can be parallelized at a network node. The fact that processing flows are not restricted to simple push/pop semantics, processing whichever token is on top, is a differentiator from other token-based protocols. Furthermore, token cell processing supports pipelining of output results from the processing of one stage as input to the next stage.

Code associated with particular types of token cells is invoked through a match engine that causes the execution of supporting microcode based on longest prefix matching applied to a portion of the token cell. The processing of each token cell can by itself be very simple. Tokens may be processed serially or in parallel, and can be mapped to pipelines with a limited number of stages. TCR is expected to be reasonably straightforward to implement at line rate performance (e.g., at or above 10 gigabits per second (10 Gb/s)). At the same time, TCR itself is highly extensible, as it is possible to support new token cell types by registering corresponding codepoints with the match engine.

TCR allows for a "lego-esque" composition of packet processing behavior while at the same time being hardware friendly, easy to optimize for performance at line rate, general in nature, and easy to extend. One distinction from earlier protocols is the ability to process a variable number of processing actions at each hop, as directed by the token cell structure. Furthermore, token cells do not need to be processed in the order in which they are placed in the packet and may be explicitly programmed for a flow.

FIG. 1 illustrates an embodiment of a network 100 configured to implement TCR. As shown, the network 100 comprises a plurality of edge nodes 102 and a plurality of internal nodes 104 interconnected by a plurality of communication links 106. The edge nodes 102 are located at an edge or a boundary of the network 100. As such, the edge nodes 102 may be coupled to one or more nodes, such as a source node 108 or a destination node 110, disposed outside of the network 100. The internal nodes 104 are located within the network 100. The underlying physical network of network 100 may be any type of transport network such as an electrical network and/or an optical network. The communication links 106 may comprise physical links such as fiber optic links, electrical links, wireless links and/or logical links used to transport data in the network 100. In an embodiment, the network 100 employs multiprotocol label switching (MPLS), segment routing (SR), or another protocol to transport packets through the network 100 along a path 112. The edge nodes 102, the internal nodes 104, the source 108, and the destination 110 may be referred to herein as a network device, network apparatus, etc.

Figure 2:
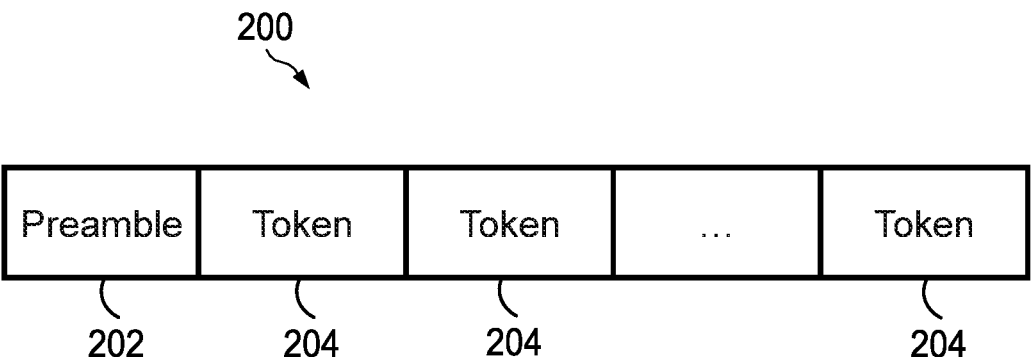
FIG. 2 illustrates an embodiment of a packet that may be transported through the network of FIG. 1.

FIG. 2 illustrates an embodiment of a packet 200 that may be transported through the network 100 of FIG. 1. As shown, the packet 200 includes a preamble 202 and a plurality of token cells 204. While the packet 200 in FIG. 2 is depicted as including only the preamble 202 and the tokens 204, the packet 200 may include additional structures, components, or information in practical applications.

As shown in FIG. 2, there is no separate payload portion of the packet. Instead, the payload is carried by one of the token cells 204. The payload carrying token cell 204 is generally located at or near the tail end of the packet 200. This allows for different payload delivery semantics at the destination, including simply stripping the payload off or applying a special type of codec. This also allows for the possibility of payload-less packets that can be used for signaling and control purposes. Nevertheless, a payload of a packet can optionally be in a separate portion of the packet, and not be part of a token cell.

The preamble 202 contains a small number of items, such as a version number (e.g., to allow for subsequent iterations of the design) and a hop-count (e.g., as a network safety feature). In an embodiment, the preamble 202 may contain other information or parameters used to facilitate transport of the packet 200, to process the packet 200, to identify structures within the packet 200, and so on.

In an embodiment, the token cells 204 are each a discrete portion of the packet 200. That is, each of the token cells 204 includes a number of bits in the packet and represents a unit within the packet 200 to potentially be processed. The first of the token cells 204 following the preamble is the first token cell to be processed by a network node (a.k.a., the forwarder). The first of the token cells 204 may be the only token cell 204 to be processed at this layer of the network 100, or the token cell may instruct the forwarder to also process one or more additional token cells before sending the packet to the next hop. When the packet 200 (a.k.a., a TCR packet) exits the network layer, the set of token cells 204 associated with that layer are popped (e.g., removed from the packet 200 or discarded). When needed, the preamble 202 is reconstructed, and processing continues with the next token cell 204. In an embodiment, the first of the token cells 204 in the packet 200 is always processed.

The token cells 204 may have different types, each with their own processing semantics. In an embodiment, one of the token cells 204 comprises a forwarding token cell type. The forwarding token cell type specifies a destination address and a method of delivery of the packet 200. For example, the destination address may be an Internet Protocol version 6 (IPv6) address and the method of delivery may be TCR.

In an embodiment, one of the token cells 204 comprises a service level objective (SLO) token cell type. The SLO token cell type specifies a target quality of delivery. For example, the target quality of delivery may be to deliver the packet 200 within a specified time (e.g., 100 microseconds (μs)), within a specified time period (e.g., between 100 μs and 150 μs), and so on.

In an embodiment, one of the token cells 204 comprises a metadata token cell type. The metadata token cell type signifies that the token cell is configured to carry metadata that can be referenced and accessed during processing of other token cells. Examples of metadata include service level objectives (SLOs) that should be taken into account for quality of service (QoS) treatment, profiles to apply towards processing a packet, security material, tags used for classification, and so on. In an embodiment, the metadata stored in a token cell of the metadata token cell type may indicate that the metadata not be modified while the packet is in flight.

In an embodiment, one of the token cells 204 comprises a scratchpad token cell type. The scratchpad token cell type signifies that the token cell is configured to store writeable metadata. That is, metadata may be written into the scratchpad token cell by a node (e.g., node 102, 104). In an embodiment, existing metadata in the scratchpad token cell is overwritten with new metadata by a node. The writeable metadata may include, for example, the telemetry data collected as the packet 200 travels between two or more nodes (e.g., nodes 102, 104) or the telemetry data collected as the packet travels along an end-to-end (E2E) path (e.g., path 112). In an embodiment, scratchpad token cells are not "processed" and are instead only written to or referenced by other token cells. In an embodiment, the metadata stored in a token cell of the scratchpad token cell type may be modified while the packet is in flight.

In an embodiment, one of the token cells 204 comprises a security token cell type. The security token cell type identifies which token cells, or portions thereof, are covered by a cryptographic signature.

In an embodiment, one of the token cells 204 comprises a conditional token cell type. The conditional token cell type is configured to test one or more conditions and to make invocation of a subsequent token cell dependent on the one or more conditions evaluating to true. That is, when a condition in the conditional token cell is true, a subsequent token cell identified by the value in the next token field is processed. In contrast, when a condition in the conditional token cell is false, a subsequent token cell identified by the value in the next token field is not processed.

In an embodiment, one of the token cells 204 comprises a directive token cell type. The directive token cell type specifies an action that should be performed. In an embodiment, the action of the directive token cell is performed in response to a condition in a conditional token cell having evaluated true. In an embodiment, the action of a directive token cell is performed in response to each of the conditions in a plurality of conditional token cells having evaluated true. In an embodiment, the action of a directive token cell is performed in response to any one of a plurality of conditions in a plurality of conditional token cells having evaluated true. In an embodiment, the action of a directive token cell is not dependent upon a condition. That is, the action is not performed in response to processing a conditional token cell.

In an embodiment, one of the token cells 204 comprises a payload token cell type. The payload token cell type signifies that the token cell carries a payload. The payload may, for example, comprise data or information intended for one of the nodes 102, 104 or for the destination node 110.

The token cells 204 are designed for efficient mapping to hardware, based on match and effect. The token cells 204 may also be referred to herein as tokens, structured tokens, or headers.

Figure 3:
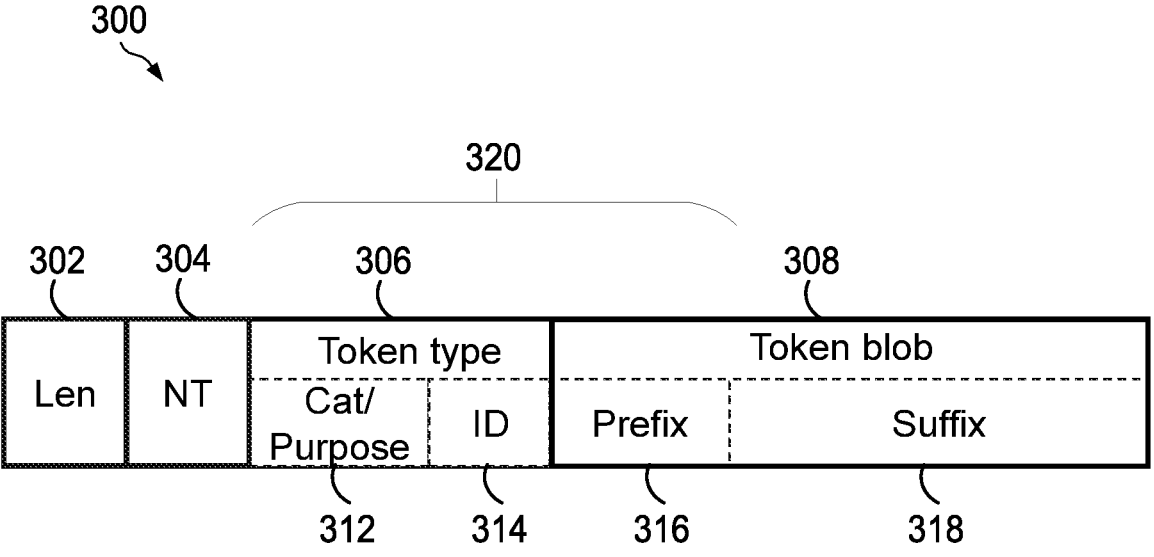
FIG. 3 illustrates an embodiment of a token cell in further detail.

FIG. 3 illustrates an embodiment of a token cell 300 in further detail. As shown, the token cell 300 includes a length field 302, a next token field 304, a token type field 306, and a token blob field 308. However, in practical applications the token cell 300 may include more or fewer fields.

The length field 302 includes a value that indicates a length of the token cell 300, which can vary. For some token types, the value indicated in the length field 302 can be fixed based on said token type. That is, the length of the token cell 300 corresponds to the token type in some embodiments.

The next token field 304 includes a value that identifies the next token to serially process, if any. That is, the next token field 304 specifies a location of a subsequent token cell in processing order. In this way, the next token field 304 functions as a pointer or offset in some embodiments. In an embodiment, the next token field 304 only includes a pointer to one other token cell 304. In an embodiment, the next token field 304 may include a pointer to more than one other token cell 304.

The token type field 306 (or simply, token type) includes a value that identifies the type of token cell. For example, the value may identify the token cell as one of the token cell types identified herein (e.g., a forwarding token cell, an SLO token cell, a payload token cell, etc.). In an embodiment, the token type field 306 comprises a token category 312 and a token identifier (ID) 314. The token category 312 specifies the category or the purpose of the token cell 300, while the token ID 314 identifies a parameter corresponding to the token type. By way of example the token category 312 may specify the category of the token cell as forwarding and the token ID 314 may identify the protocol used for forwarding as IPv6. In an embodiment, the token ID 314 may be referred to as a sub-type.

The token blob field 308 (or simply, token blob) is configured to carry the information needed to process the explicit packet 300 carrying the token blob field 308. In an embodiment, the token blob field 308 is configured to record information about the packet for later use. That is, the token blob field 208 is a portion of the token that can optionally have various properties, as described herein. In an embodiment, the structure of the token blob field 308 depends on the token cell type. In an embodiment, the token blob field 308 comprises a prefix 316 and a suffix 318.

In an embodiment, the prefix 316 is used to qualify or further refine the information provided by the token ID 314. For example, when the token ID 314 (a.k.a., the sub-type) is IPv6, the prefix 316 would include an IPv6 address. In an embodiment, the prefix 316 may have a variable length. That is, the length of the prefix 316 is not fixed in some embodiments. In an embodiment, one or more of the length, structure, and contents of the prefix 316 are dependent on the token cell type.

The suffix 318 is configured to carry any structure. For example, the suffix 318 may contain sub-fields, parameters, or information used in processing the packet 300. In an embodiment, one or more of the length and contents of the suffix 318 are dependent on the token cell type.

As shown in FIG. 3, the match zone 320 includes the token type field 306 and the prefix field 316 of the token blob field 308. As will be more fully discussed below, the match zone 320 is fed into a longest match engine to facilitate packet processing.

Figures 4A, 4B, 4C:
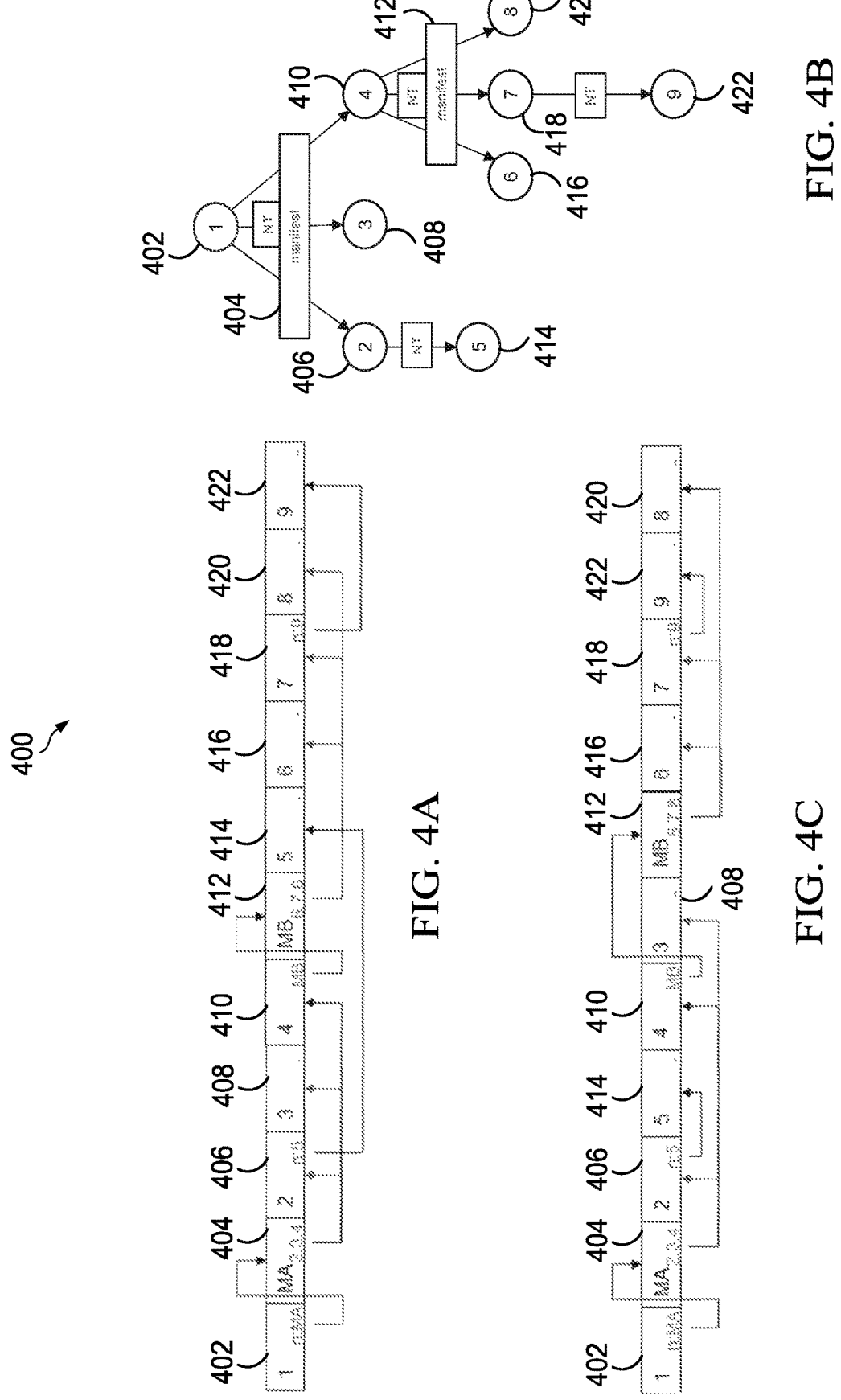
FIGS. 4A-4B illustrate an embodiment of processing token cells in a packet in both serial and parallel fashion.
FIG. 4C illustrates that the packet permutations can be accommodated in the packet.

FIGS. 4A-4B illustrate an embodiment of processing token cells in a packet 400 in both serial and parallel fashion. In an embodiment, the first token cell 402 of the packet 400 is always processed. As shown, the first token cell 402 includes a next token field (e.g., next token field 304 in FIG. 3, which may be abbreviated NT) with the value of n:MA to specify a location of a first manifest token cell 404. Therefore, the first manifest token cell 404 is processed serially after the first token cell 402.

In an embodiment, manifest token cells (e.g., the first manifest token cell 404) are the same as or similar to the token cell 300 in FIG. 3. That is, the first manifest token cell 404 has the same or similar structure as the token cell 300. However, the manifest token cells are used to indicate where parallel processing is needed. In an embodiment, the manifest token cells are included in the packet 400 prior to the token cells to be processed in parallel.

The first manifest token cell 404 specifies a plurality of additional token cells in the packet 400 to be processed in parallel. The plurality of additional token cells to be processed in parallel may be specified in a variety of different ways. For example, the first manifest token cell 404 can include a first manifest token field with a value of 2 to specify the location of the second token cell 406 and a token cell blob (e.g., token cell blob 308 of FIG. 3) with the values of 3 and 4 to specify the location of the third token cell 408 and the fourth token cell 410. Thus, the manifest token cell 404 can indicate that the second, third, and fourth token cells 406, 408, 410 are to be processed in parallel. As with the next token field 304, and other indications of other tokens throughout this disclosure, the indication of a token (or the location of the token) can be in the form of a pointer, offset, or other forms.

As another example, the first manifest token cell 404 can include a first manifest token field with a null value (e.g., 0 or −) signifying that no subsequent token cell to be processed is identified and a token cell blob with the values of 2, 3, and 4 to specify the location of the second token cell 406, the third token cell 408, and the fourth token cell 410.

As a further example, the first manifest token cell 404 can include a first manifest token field with a value of 2, 3, and 4 to specify the location of the second token cell 406, the third token cell 408, and the fourth token cell 410. That is, the first manifest token field of the first manifest token 404 may include more than one value. In another example, the first manifest token cell 404 can include several manifest token fields, each with a value of 2, 3, or 4, to specify the location of the second token cell 406, the third token cell 408, and the fourth token cell 410.

Regardless of the way in which the second token cell 406, the third token cell 408, and the fourth token cell 410 are identified, the second token cell 406, the third token cell 408, and the fourth token cell 410 are processed in parallel after the first manifest token cell 404 is processed.

The second token cell 406 includes a next token field with the value of n:5 to specify a location of a fifth token cell 414. Therefore, the fifth token cell 414 is processed serially after the fourth token cell 410. The third token cell 408 includes a next token field with the null value signifying that no subsequent token cell to be processed is identified.

The fourth token cell 410 includes a next token field with the value of n:MB to specify a location of a second manifest token cell 412. Therefore, the second manifest token cell 412 is processed serially after the fourth token cell 410.

The second manifest token cell 412 specifies a plurality of additional token cells in the packet 400 to be processed in parallel. The plurality of additional token cells to be processed in parallel may be specified in a variety of different ways, as described above. In the illustrated embodiment, the second manifest token cell 412 specifies a location of the sixth token cell 416, the seventh token cell 418, and the eighth token cell 420. Thus, the sixth token cell 416, the seventh token cell 418, and the eighth token cell 420 are processed in parallel after the second manifest token cell 412 is processed.

The sixth token cell 416 and the eighth token cell 420 both include a next token field with the null value signifying that no subsequent token cell to be processed is identified. However, the seventh token cell 418 includes a next token field with the value of n:9 to specify a location of the ninth token cell 422. Therefore, the ninth token cell 422 is processed serially after the seventh token cell 418. The ninth token cell 422 includes a next token field with the null value signifying that no subsequent token cell to be processed is identified.

Processing of the packet 400 continues until there are no additional "reachable" token cells to processes. That is, no processed token cells point to additional token cells to be processed next. Thus, for example, there may optionally be additional token cells remaining, that are not processed, because they are not pointed-to by a processed token cell. Those remaining token cells can potentially be processed by another node along the packets path when, for example, other tokens are popped from the packet.

FIG. 4C illustrates that the packet permutations can be accommodated in the packet 400. That is, token cells do not have to be arranged in a stack and can be organized in any manner to, for example, promote efficient processing. In FIG. 4C, the same operations are performed by the node processing the packet, even though the arrangement of the token cells has changed. In an embodiment, only forward references are permitted to avoid loops. For example, a node may not allow processing a preceding token cell, upon it being referenced by a subsequent token cell, during serial processing.

While FIGS. 4A-4C illustrate one example of processing token cells in a packet 400 in both serial and parallel fashion, the order and type of token cells in packets may be different in practical applications. That is, the scope of the present disclosure should not be limited to the illustrated example.

Figures 5A, 5B:
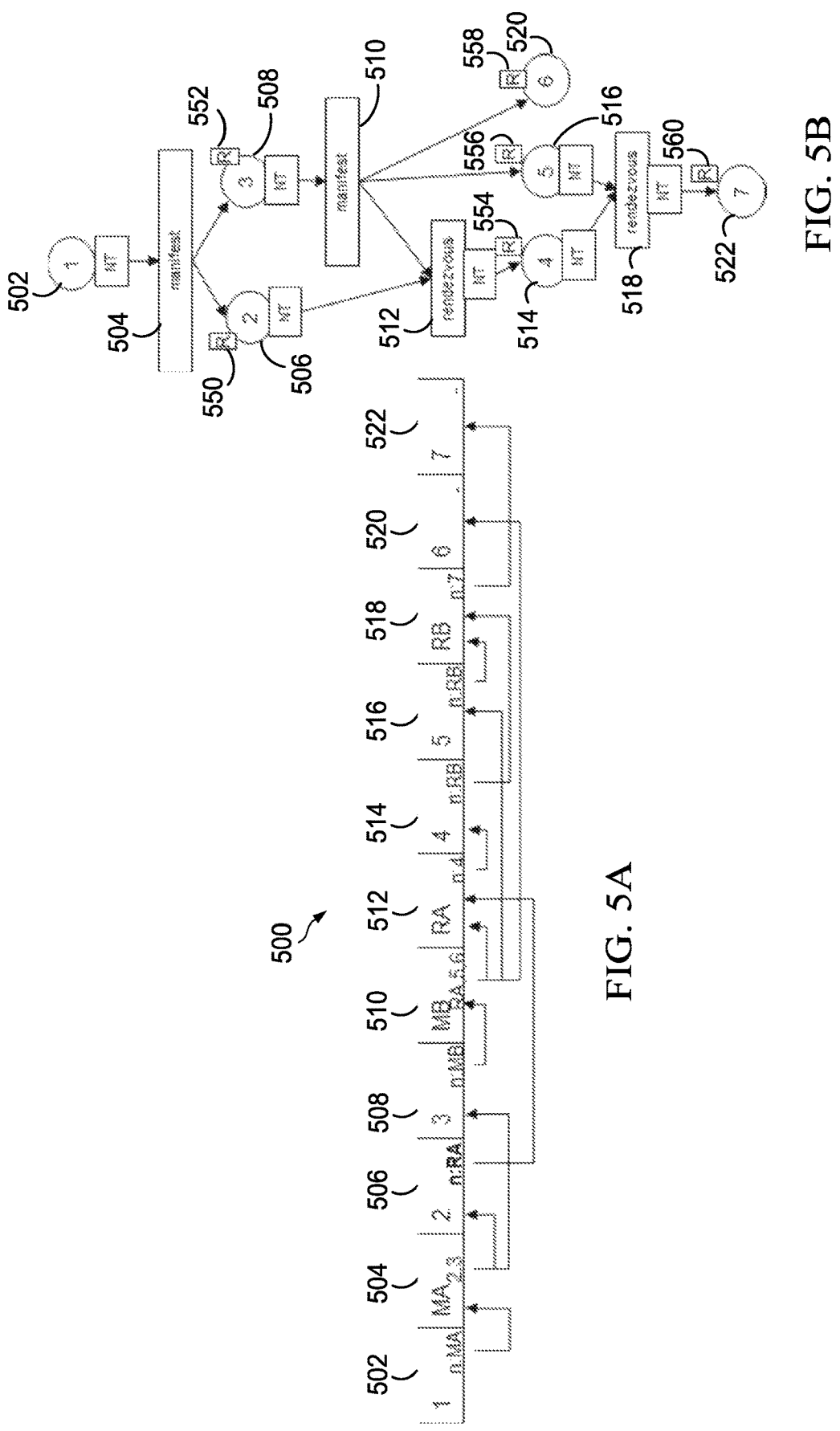
FIGS. 5A-5B illustrate an embodiment of processing token cells in a packet in both serial and parallel fashion.

FIGS. 5A-5B illustrate an embodiment of processing token cells in a packet 500 in both serial and parallel fashion. In an embodiment, the first token cell 502 of the packet 500 is always processed. As shown, the first token cell 502 includes a next token field (e.g., next token field 304 in FIG. 3) with the value of n:MA to specify a location of a first manifest token cell 504. Therefore, the first manifest token cell 504 is processed serially after the first token cell 502.

The first manifest token cell 504 specifies a plurality of additional token cells in the packet 400 to be processed in parallel. In FIG. 5A, the first manifest token cell 504 identifies a location of the second token cell 506 and the third token cell 508 to be processed in parallel after the first manifest token cell 504 is processed.

In an embodiment, one or more of the token cells in the packet 500 have a corresponding or associated input register (a.k.a., register, pipeline state register, etc.). For example, the result of processing the second token cell 506 is stored in an input register 550 and the result of processing the third token cell 508 is stored in an input register 552. That is, the input register 550 and the input register 552 are populated with the result obtained by processing the second token cell 506 and the third token cell 508, respectively.

The second token cell 506 includes a next token field with the value of n:RA to specify a location of a first rendezvous token cell 512. As will be more fully explained below, rendezvous token cells (e.g., the first rendezvous cell 512) are used to merge the results of any token cells being processed in parallel. That is, rendezvous token cells allow for synchronization between token cells, or "threads," being processed in parallel. In an embodiment, rendezvous token cells are not processed until a result of each token cell being processed in parallel has been received. In an embodiment, the specific merge function provided by rendezvous token cells is determined by, or based upon, the token cell type. In an embodiment, a rendezvous token cell utilizes an indicator in the rendezvous token to determine how many tokens are to be received and/or merged together. In an embodiment, a rendezvous token cell includes an identification (ID) of each input (e.g., token cell) that should be received and/or merged. In such an embodiment, the received token cells carry the ID used by the rendezvous token cell for this purpose.

The third token cell 508 includes a next token field with the value of n:MB to specify a location of a second manifest token cell 510. Therefore, the second manifest token cell 510 is processed serially after the third token cell 508.

The second manifest token cell 510 specifies a plurality of additional token cells in the packet 500 to be processed in parallel. In FIG. 5B, the second manifest token cell 510 identifies a location of the first rendezvous token cell 512, a fifth token cell 516, and a sixth token cell 520 to be processed in parallel after the first manifest token cell 504 is processed.

The result of processing the second manifest token cell 510 stored in input register 550 and the result of processing the third token cell 508 stored in input register 552 are merged by the first rendezvous token 512. The first rendezvous token cell 512 includes a next token field with the value of n:4 to specify a location of a fourth token cell 514. Therefore, the fourth manifest token cell 514 is processed serially after the first rendezvous token cell 512.

In an embodiment, the result of processing the fourth token cell 514 is stored in an input register 554. The fourth token cell 514 includes a next token field with the value of n:RB to specify a location of a second rendezvous token cell 518. Therefore, the second rendezvous token cell 518 is processed serially after the fourth token cell 514.

In an embodiment, the result of processing the result of processing the fifth token cell 516 is stored in input register 556, and the result of processing the sixth token cell 518 is stored in input register 558.

The result of processing the fourth token cell 514 stored in input register 554 and the result of processing the fifth token cell 516 stored in input register 556 are merged by the second rendezvous token 518. The second rendezvous token cell 518 includes a next token field with the value of n:7 to specify a location of a seventh token cell 522. Therefore, the seventh token cell 522 is processed serially after the second rendezvous token cell 518.

In an embodiment, the result of processing the seventh token cell 522 is stored in input register 560. The sixth token cell 520 and the seventh token cell 522 each include a next token field with the null value signifying that no subsequent token cell to be processed is identified.

While FIGS. 5A-5B illustrate one example of processing token cells in a packet 500 in both serial and parallel fashion, the order and type of token cells in packets may be different in practical applications. That is, the scope of the present disclosure should not be limited to the illustrated example.

Figure 6:
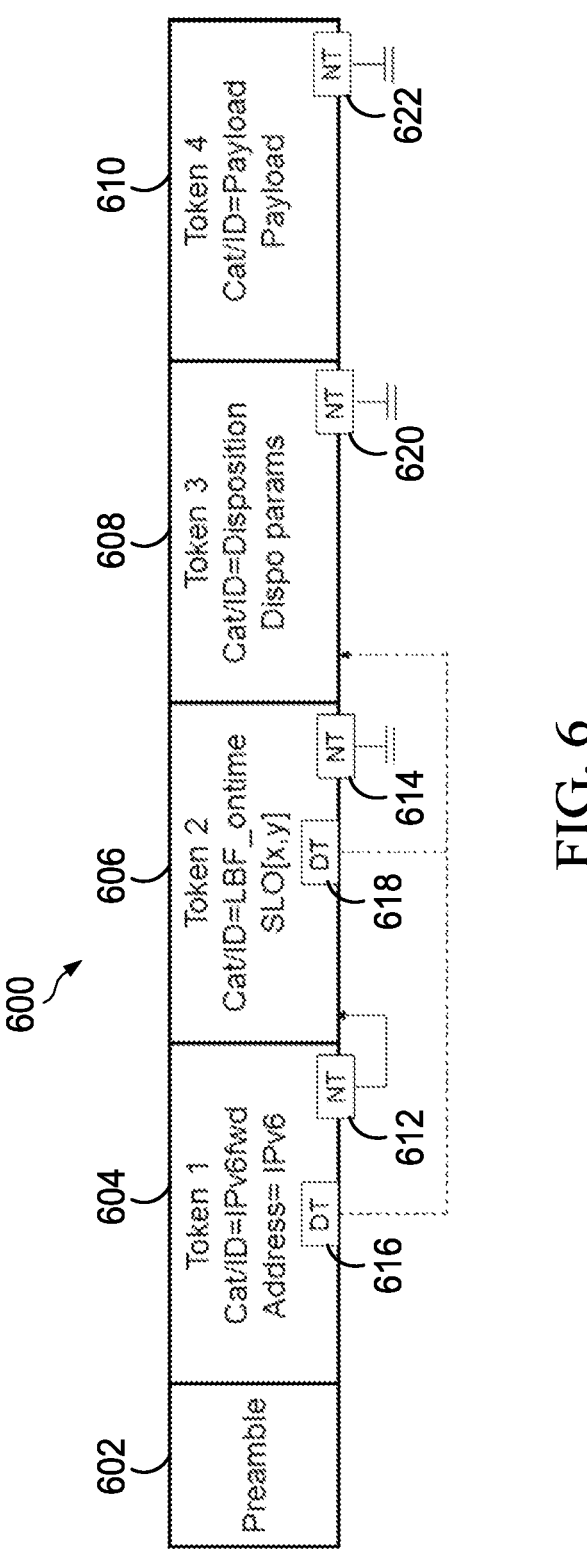
FIG. 6 illustrates an embodiment of latency-based forwarding using token cells in a packet.

FIG. 6 illustrates an embodiment of latency-based forwarding using token cells in a packet 600. In an embodiment, the packet 600 is first processed at an internal node (e.g., internal nodes 104) and then processed at an edge node (e.g., edge node 102), as will be more fully explained below. As shown, the packet 600 comprises a preamble 602, a first token cell 604, a second token cell 606, a third token cell 608, and a fourth token cell 610. In other embodiments, the packet 600 may include more or fewer token cells.

The preamble 602 is similar to the preamble 202 in FIG. 2. That is, the preamble 602 may include a small number of items, such as a version number (e.g., to allow for subsequent iterations of the design) and a hop-count (e.g., as a network safety feature). In an embodiment, the preamble 602 may contain other information or parameters used to facilitate transport of the packet 600, to process the packet 600, to identify structures within the packet 600, and so on.

After the preamble 602 has been processed by the node, the node processes the first token cell 604. As shown, the first token cell 604 includes a category/ID of IPv6fwd to indicate that the first token cell 604 should be forwarded according to the IPv6 protocol. The first token cell 604 also includes an address (e.g., a destination address) of IPv6, which represents a 128-bit IPv6 address carried by the first token cell 604.

The first token cell 604 also includes a next token field 612. The next token field 612 is similar to the next token field 304 in FIG. 3. As shown in FIG. 6, the next token field 612 specifies a location of the second token cell 606. Therefore, after the first token cell 604 has been processed by the node, the second token cell 606 is processed.

The second token cell 606 includes a category/ID of LBF_ontime to indicate that the second token cell 606 should be delivered according to a specified time constraint.

The second token cell 606 also includes an SLO[x,y] to indicate the specified time constraint. For example, the SLO[x,y] may indicate that the packet 600 should be delivered in a specified range (e.g., between x, which may be 100 microseconds (μs), and y, which may be 110 μs).

The second token cell 606 also includes a next token field 614. The next token field 614 is similar to the next token field 304 in FIG. 3. As shown in FIG. 6, the next token field 614 includes a null value signifying that no subsequent token cell to be processed is identified. When the SLO identified in the second token cell 606 has been met, the packet 600 is forwarded to the next node along the path (e.g., path 112 in FIG. 1). During this process of forwarding the packet between nodes, input registers may be utilized as described above. That is, output and input chaining can occur using input registers.

When the SLO identified in the second token cell 606 has not been met, the node consults the disposition token cell field 618. The disposition token cell field 618 specifies a location of a disposition token cell. In the illustrated example, the disposition token cell field 618 points to the third token cell 608. Therefore, after processing the second token cell 606, the node processes the third token cell 608.

The third token cell 608 includes a category/ID of disposition to indicate that the disposition parameters (e.g., Dispo params) should be carried out by the node. By way of example, the disposition parameters may instruct the node to discard the packet when the SLO has not been achieved.

When the node (e.g., edge node 102) having the IPv6 address identified in the first token cell 604 receives the packet 600, processing of the packet 600 changes. Instead of consulting the next token field 612, the node looks to the disposition token cell field 616 to determine how to process the packet 600. The disposition token cell field 616 specifies a location of a disposition token cell. In the illustrated example, the disposition token cell field 616 points to the third token cell 608.

Therefore, after processing the first token cell 604, the node processes the third token cell 608. That is, the second token cell 606 is skipped and not processed by the node. The third token cell 608 includes a next token field 620. As shown in FIG. 6, the next token field 620 includes a null value signifying that no subsequent token cell to be processed is identified.

The third token cell 608 includes a category/ID of disposition to indicate that the disposition parameters (e.g., Dispo params) should be carried out by the node. By way of example, the disposition parameters may instruct the node to pop the first token cell 602, the second token cell 604, and the third token cell 606 off the packet 600 and to deliver the fourth token cell 610, which has the category/ID of Payload and contains payload, to the destination node (e.g., the destination node 110 in FIG. 1) in an external network. As used herein, external network refers to any network outside the network 100 in FIG. 1.

In an embodiment, the first token cell 602 may be penultimate hop popped (PHP), in which case the first token cell 602 is popped earlier, in which case the second token cell 604 will be the initial token cell encountered by the destination node. In an embodiment, the second token cell 604 cannot be PHP'ed when the LBF policy applies to the last hop.

The fourth token cell 610 includes a next token field 622. As shown in FIG. 6, the next token field 622 includes a null value signifying that no subsequent token cell to be processed is identified.

Figure 7:
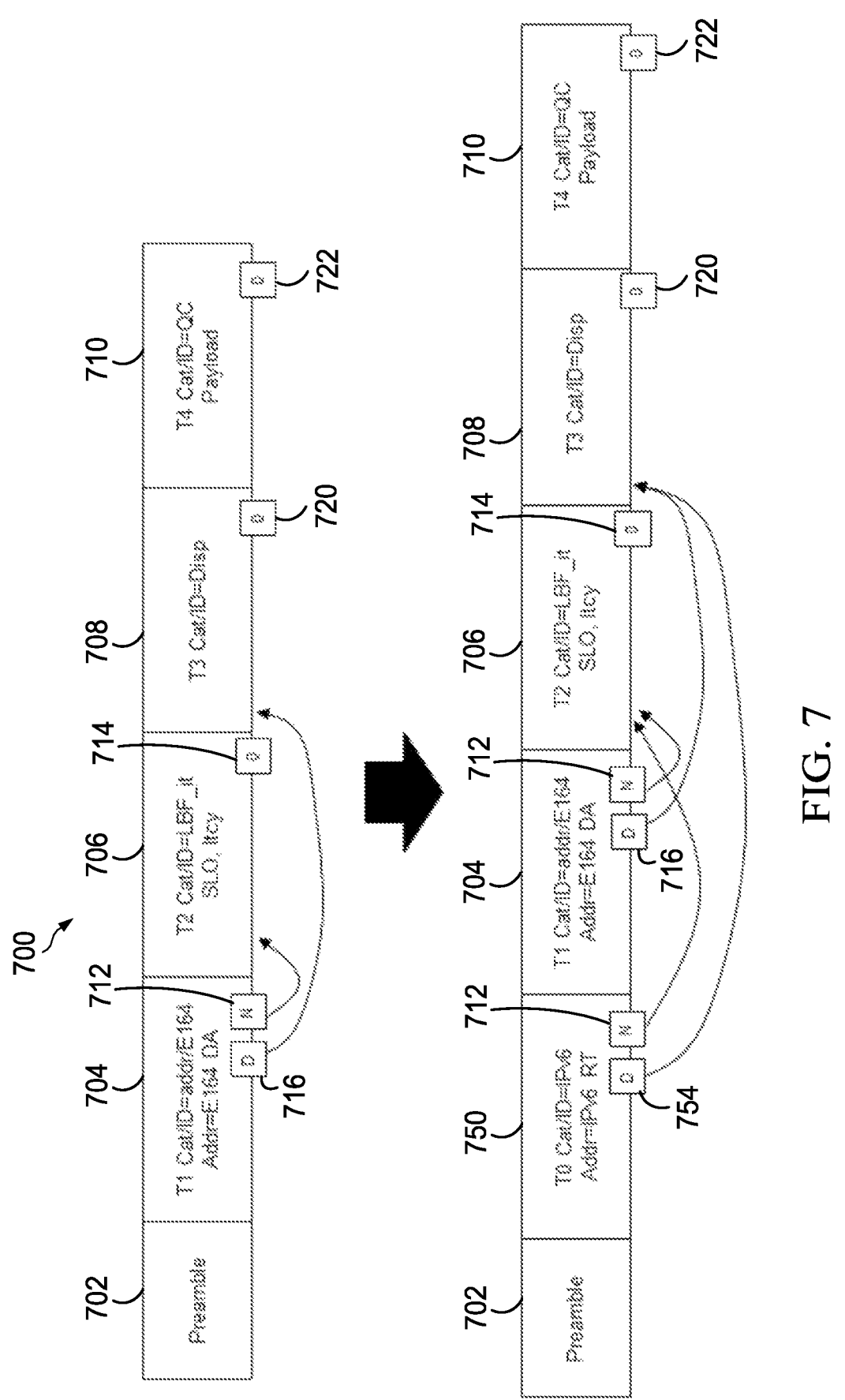
FIG. 7 illustrates an embodiment of fast re-route with latency-based forwarding using token cells in a packet.

FIG. 7 illustrates an embodiment of fast re-route with latency-based forwarding using token cells in a packet 700. The packet 700 may be processed by, for example, one of the nodes (e.g., internal nodes 104). As shown, the packet 700 initially comprises a preamble 702, a first token cell 704, a second token cell 706, a third token cell 708, and a fourth token cell 710. In other embodiments, the packet 600 may include more or fewer token cells. In other embodiments, the packet 700 may include more or fewer token cells.

The preamble 702 is similar to the preamble 602 in FIG. 6. That is, the preamble 702 may include a small number of items, such as a version number (e.g., to allow for subsequent iterations of the design) and a hop-count (e.g., as a network safety feature). In an embodiment, the preamble 702 may contain other information or parameters used to facilitate transport of the packet 700, to process the packet 700, to identify structures within the packet 700, and so on.

After the preamble 702 has been processed by the node, the node processes the first token cell 704. As shown, the first token cell 704 includes a category/ID of addr/E164 to indicate that the first token cell 704 should be forwarded according to the international public telecommunication numbering plan protocol (which is known as E.164). The first token cell 704 also includes an address of E164 DA (e.g., a destination address).

The first token cell 704 also includes a next token field 712. The next token field 712 is similar to the next token field 304 in FIG. 3. As shown in FIG. 7, the next token field 712 specifies a location of the second token cell 706. Therefore, after the first token cell 704 has been processed by the node, the second token cell 706 is processed.

The second token cell 706 includes a category/ID of LBF_it to indicate that the second token cell 706 should be delivered according to a specified time constraint. The second token cell 706 also includes an SLO, latency (ltcy) to indicate the specified time constraint. For example, the SLO latency indicates that the packet 700 should be delivered within a specified latency threshold (e.g., 200 ms).

The second token cell 706 also includes a next token field 714. The next token field 714 is similar to the next token field 304 in FIG. 3. As shown in FIG. 7, the next token field 714 includes a null value signifying that no subsequent token cell to be processed is identified. When the SLO identified in the second token cell 706 has been met, the packet 700 is forwarded to the next node along the path (e.g., path 112 in FIG. 1). During this process of forwarding the packet between nodes, input registers may be utilized as described above. That is, output and input chaining can occur using input registers.

While not shown in FIG. 7, the second token cell 706 could include a disposition cell that is consulted when the SLO identified in the second token cell 706 has not been met. Such a disposition cell could point to the third token cell 708, which instructs the node to drop the packet 700 when the SLO has not been met.

The third token cell 708 includes a category/ID of disposition to indicate that the disposition parameters (e.g., Dispo params) should be carried out by the node. By way of example, the disposition parameters may instruct the node to discard the packet when the SLO has not been achieved.

When the node (e.g., edge node 102) having the E.164 address identified in the first token cell 704 receives the packet 700, processing of the packet 700 changes. Instead of consulting the next token field 712, the node looks to the disposition token cell field 716 to determine how to process the packet 700. The disposition token cell field 716 specifies a location of a disposition token cell. In the illustrated example, the disposition token cell field 716 points to the third token cell 708.

Therefore, after processing the first token cell 704, the node processes the third token cell 708. That is, the second token cell 706 is skipped and not processed by the node. The third token cell 708 includes a next token field 720. As shown in FIG. 7, the next token field 720 includes a null value signifying that no subsequent token cell to be processed is identified.

The third token cell 708 includes a category/ID of disposition to indicate that the disposition parameters (e.g., Dispo params) should be carried out by the node. By way of example, the disposition parameters may instruct the node to pop the first token cell 704, the second token cell 706, and the third token cell 708 off the packet 700 and to deliver the fourth token cell 710, which has the category/ID of QC and contains payload, to the destination node (e.g., the destination node 110 in FIG. 1) in an external network. As used herein, external network refers to any network outside the network 100 in FIG. 1.

The fourth token cell 710 includes a next token field 722. As shown in FIG. 7, the next token field 722 includes a null value signifying that no subsequent token cell to be processed is identified.

When a failure occurs within the network (e.g., network 100), the fast re-route procedure may be implemented on the packet 700 (as represented by the large arrow in FIG. 7). During the fast re-route procedure, a zeroth token cell 750 can be pushed onto the packet 700 (e.g., added to the packet 700). In an embodiment, the zeroth token cell 750 is inserted into the packet 700 prior to the first token cell 704. In an embodiment, the zeroth token cell 750 supports "free choice" and "mixed mode" addressing with the fast re-route. For example, the zeroth token cell 750 includes a destination address 754 corresponding to IPv6 protocol even though the first token cell includes a destination address corresponding to the E.164 protocol.

The zeroth token cell 750 includes a next token cell field 712 specifying a location of second token cell 706. Therefore, node processes the second token cell 706 after the zeroth token cell 750 is processed. That is, the first token cell 704 is skipped in order to avoid the failure that was detected.

When the packet 700 reaches the IPv6 address (e.g., the repair target) indicated in the zeroth token cell 750, the processing changes. In an embodiment, the node pops the zeroth token cell 750 off the packet. Then, instead of consulting the next token cell field 712, the node looks to the disposition cell field 754. The disposition cell field 754 specifies a location of the third token cell 708. Therefore, node processes the third token cell 708 after the zeroth token cell 750 is processed. The third token cell 708 includes a category/ID of disposition to indicate that the disposition parameters (e.g., Dispo params) should be carried out by the node. In an embodiment, disposition in the third token cell 708 distinguishes the repair target from the destination.

Figure 8:
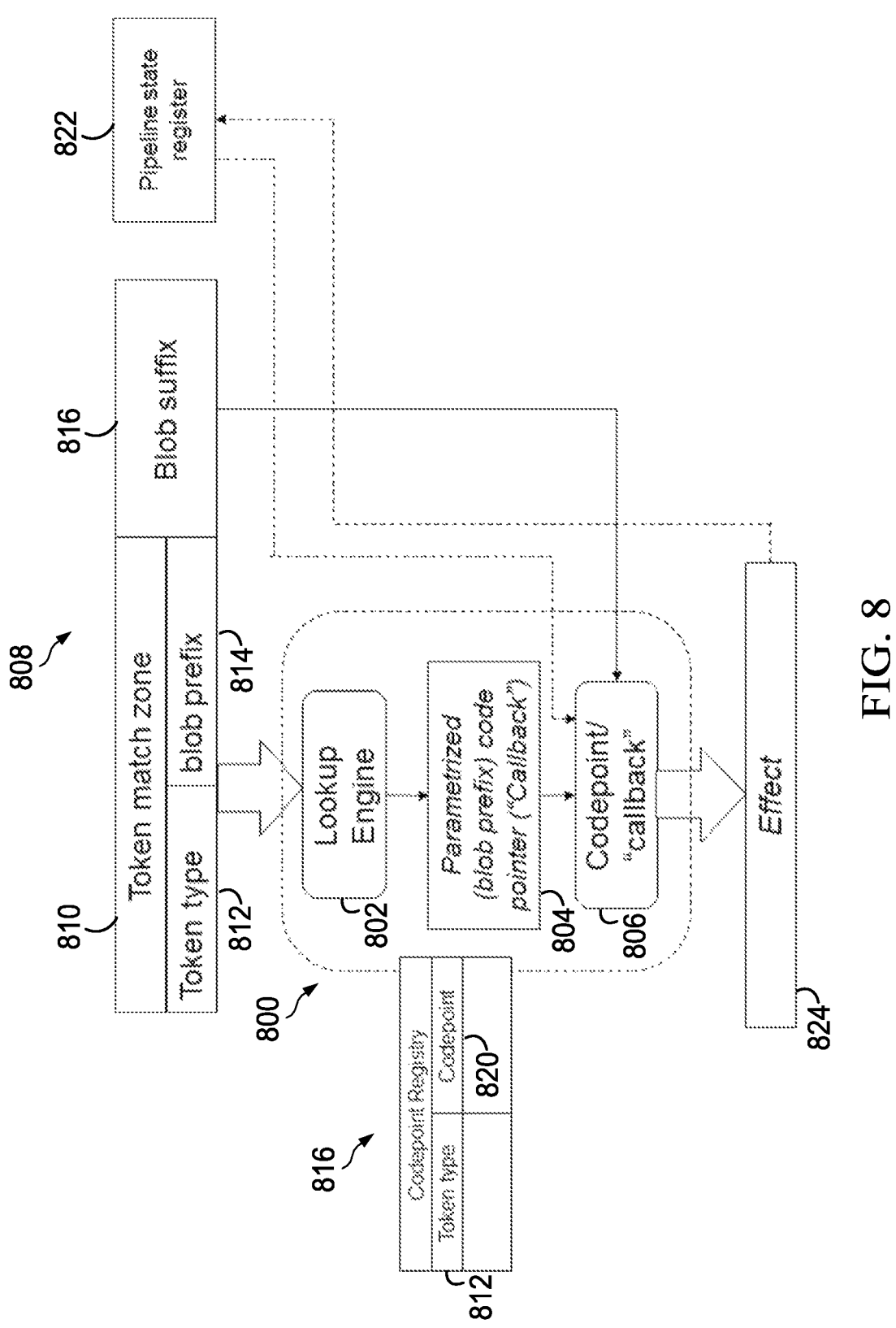
FIG. 8 illustrates an embodiment of an apparatus configured to implement token-based networking.

FIG. 8 illustrates an embodiment of an apparatus 800 configured to implement token-based networking (a.k.a., token cell routing) as disclosed herein. In an embodiment, the apparatus 800 may be implemented in any one of the nodes disclosed herein (e.g., internal node 104). As shown in FIG. 8, the apparatus 800 comprises a lookup engine 802, a parameterized code pointer 804, and a codepoint 806. The lookup engine 802, parameterized code pointer 804, and codepoint 806 may be implemented as hardware or a combination of hardware and software.

The lookup engine 802, which may be referred to herein as an extensible token routing engine, is configured to receive a token cell 808. The token cell 808 may be similar to the various token cells disclosed herein. In an embodiment, the token cell 808 includes a match zone 810 (a.k.a., token match zone), which comprises a token type field 812 and a prefix field 814 (a.k.a., blob prefix) from the suffix 816 (a.k.a., blob suffix). The match zone 810 is similar to the match zone 320 in FIG. 3. Likewise, the token type field 812 and the prefix field 814 are similar to the token type field 306 and the prefix field in FIG. 3. The suffix 816 is similar to the suffix 318 in FIG. 3.

As shown, the apparatus 800 is configured to receive the token cell 808. Upon receipt of the token cell 808, the match zone 810 of the token cell 808 is fed into the lookup engine 802. The lookup engine 802 uses the token type field 812 to obtain a codepoint 820 (a.k.a., a code pointer) from a codepoint registry 816. In an embodiment, the process of obtaining the codepoint 820 may be referred to as a longest match process. In an embodiment, the codepoint registry 816 may be referred to as a lookup table or a forwarding information base (FIB). In an embodiment, the codepoint registry 816 is stored in a memory of the apparatus 800. In an embodiment, the codepoint registry 816 can be dynamically updated to, for example, include new token types and new codepoints.

The codepoint 820 points to the address of the code to be executed on the token cell 808 by the node in order to process the token cell 808. In an embodiment, the code to be executed on the token cell is stored in a memory of the apparatus 800. The code to be executed may be used to process a token cell having, for example, a forwarding token cell type, an SLO token cell type, a metadata token cell type, a scratchpad token cell type, a security token cell type, a conditional token cell type, a directive token cell type, or a payload token cell type. That is, the code obtained from the codepoint registry 816 may be used to process various different types of token cells.

As an example of the longest match process, when the token type field 812 indicates that the token cell type is IPv6, the corresponding codepoint 820 in the codepoint registry 816 indicates that line fifty-seven of the code is to be executed in order to process the token cell 808. In contrast, when the token type field 812 indicates that the token cell type is IPv4, the corresponding codepoint 820 in the codepoint registry 816 indicates that line twenty-one of the code is to be executed in order to process the token cell 808.

The parameterized code pointer 804 represents the codepoint 820 obtained from the codepoint registry 816 and returned by the lookup engine 802. That is, the lookup engine 802 uses the codepoint registry 816 as described above to provide the apparatus 800 with the parameterized code pointer 804 pointing to the code to be executed. In an embodiment, information obtained from the blob prefix field 814 may also play a part in the execution of the code.

The codepoint 806 represents the code being executed by the apparatus 800. In an embodiment, the codepoint 806 may obtain information from the blob suffix 816 in order to process the token cell 808. In an embodiment, the codepoint 806 may obtain information stored in the register 822 in order to process the token cell 808. In an embodiment, the register 822 comprises a pipeline state register.

The result of the apparatus 800 processing the code is represented by the effect 824. In an embodiment, the result may be stored in the register 822 for use during the processing of other token cells. That is, the configuration shown in FIG. 8 allows intermediate results from the processing of one token cell to be utilized in the processing of the next token cell. Thus, a chained processing of token cells is possible.

FIG. 9 is a method 900 of token-based networking implemented by a network apparatus (e.g., intermediate network node 104) in a network (e.g., network 100). The method 900 may be implemented to transport a packet (e.g., packet 300) along a path (e.g., path 112) in the network. In particular, the method 900 may be implemented in order to facilitate TCR as described herein.

In block 902, a packet comprising a first token cell and a second token cell is received. The first token cell comprises a first next token field specifying a location of the second token cell. In an embodiment, the packet comprises a third token cell, the third token cell located in between the first token cell and the second token cell in the packet.

In block 904, the first token cell is processed. In block 906, the second token cell is processed in response to the first next token field specifying the location of the second token cell in the first next token field. In an embodiment, the first token cell and the second token cell are each processed in a manner similar to that described with regard to FIG. 8.

In block 908, the packet is transmitted. In an embodiment, the packet is forwarded toward the next node or toward an edge node along the path.

In an embodiment, the second token cell comprises a second next token field specifying a location of a third token cell to be processed following processing of the second token cell.

In an embodiment, the second token cell comprises a second next token field and a token cell blob. The second next token field specifies a location of a third token cell. The token cell blob specifies one or more additional token cells. In an embodiment, the method further comprises processing the third token cell and the one or more additional token cells in parallel.

In an embodiment, the second token cell comprises a second next token field and a token cell blob. The second next token field includes a null value. The token cell blob specifies a plurality of additional token cells. In an embodiment, the method further comprises processing the plurality of additional token cells in parallel.

In an embodiment, a result of processing the first token cell or the second token cell is stored in an input register. In an embodiment, a third token cell in the packet is processed using the result of processing the first token cell or the second token cell stored in the input register.

In an embodiment, a third token cell in the packet comprises a rendezvous token cell. The rendezvous token cell is configured to merge a first result of processing the first token cell and a second result of processing the second token cell.

In an embodiment, the first token cell comprises an address and a disposition token cell field specifying a location of a disposition token cell. In an embodiment, the method further comprises determining that the packet has arrived at the address, and processing the disposition token cell at the location in response to the determination that the packet arrived at the address.

In an embodiment, the method further comprises discarding the first token cell and the second token cell in response to processing the disposition token cell, and forwarding a payload token cell carrying a payload to an external network outside the network.

In an embodiment, the method further comprises detecting a failure along an intended path for the packet, pushing a reroute token cell onto the packet, the reroute token cell comprising a reroute target address and a reroute next token field specifying a location of the second token cell, processing the second token cell, and forwarding the packet according to the reroute target address until the reroute target address is reached.

In an embodiment, the method further comprises popping the reroute token cell off the packet in response to the packet reaching the reroute target address. In an embodiment, the second token cell includes a second token field containing a null value signifying that no subsequent token cell to be processed is identified.

In an embodiment, the first token cell includes a first length field specifying a length of the first token cell, the second token cell includes a second length field specifying a length of the second token cell, and the length of the first token cell is configured to be different than the length of the second token cell.

In an embodiment, the first token cell comprises a match zone, and the method further comprises feeding the match zone into a longest match engine. In an embodiment, the match zone comprises a token cell type and a prefix of a token cell blob.

In an embodiment, the first token cell comprises a forwarding token cell type specifying a destination address and a method of delivery of the packet. In an embodiment, the first token cell comprises a service level objective (SLO) token cell type, the SLO token cell type specifying a target quality of delivery. In an embodiment, the first token cell comprises a metadata token cell type signifying that the first token cell is configured to carry metadata that can be referenced and accessed during processing of other token cells. In an embodiment, the first token cell comprises a scratchpad token cell type signifying that the first token cell is configured to store writeable metadata. In an embodiment, the first token cell comprises a security token cell type identifying which token cells, or portions thereof, are covered by a cryptographic signature.

In an embodiment, the first token cell comprises a conditional token cell type. The conditional token cell type is configured to test one or more conditions and to make invocation of a subsequent token cell dependent on the one or more conditions evaluating to true. In an embodiment, the first token cell comprises a directive token cell type. The directive token cell type specifies an action that should be performed.

In an embodiment, a third token cell comprises a payload token cell type. The payload token cell type signifies that the third token cell carries a payload. In an embodiment, the first token cell includes token type comprising a token category and a token identifier (ID). The token category specifies a category or purpose of the first token cell and the token ID identifies a parameter corresponding to the token type.

Figure 10:
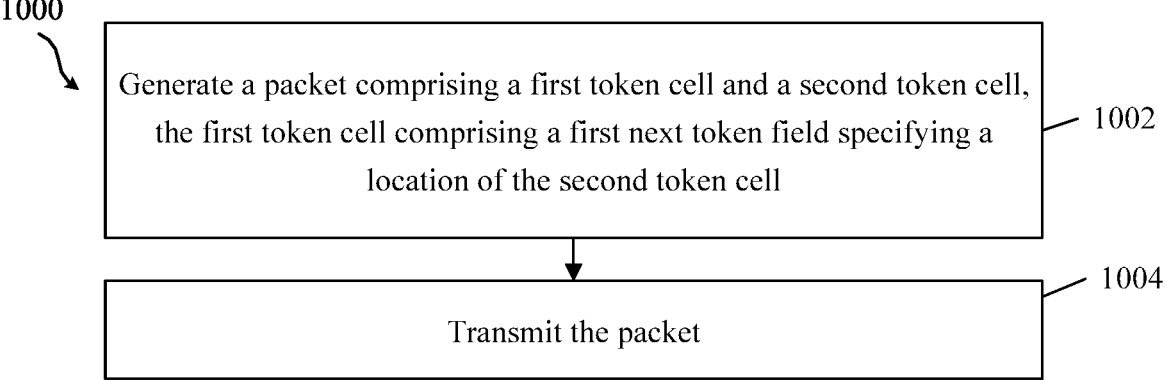
FIG. 10 is a method of token-based networking implemented by a network apparatus in a network.

FIG. 10 is a method 1000 of token-based networking implemented by a network apparatus (e.g., intermediate network node 104) in a network (e.g., network 100). The method 1000 may be implemented to generate a packet (e.g., packet 300) that can be transmitted along a path (e.g., path 112) in the network. In particular, the method 1000 may be implemented in order to facilitate TCR as described herein.

In block 1002, a packet comprising a first token cell and a second token cell is generated. The first token cell comprises a first next token field specifying a location of the second token cell to be processed following processing of the first token cell.

In block 1004, the packet is transmitted. In an embodiment, the packet is transmitted toward another network apparatus.

In an embodiment, the packet comprises a third token cell. The third token cell located in between the first token cell and the second token cell in the packet. In an embodiment, the second token cell comprises a second next token field specifying a location of a third token cell to be processed after the second token cell has been processed.

In an embodiment, the second token cell specifies one or more additional token cells to be processed in parallel following processing of the second token cell. In an embodiment, a third token cell in the packet comprises a rendezvous token cell. The rendezvous token cell is configured to merge a first result of processing the first token cell and a second result of processing the second token cell.

In an embodiment, the first token cell comprises an address and a disposition token cell field specifying a location of a disposition token cell to be processed after the first token cell has arrived at the address.

Figure 11:
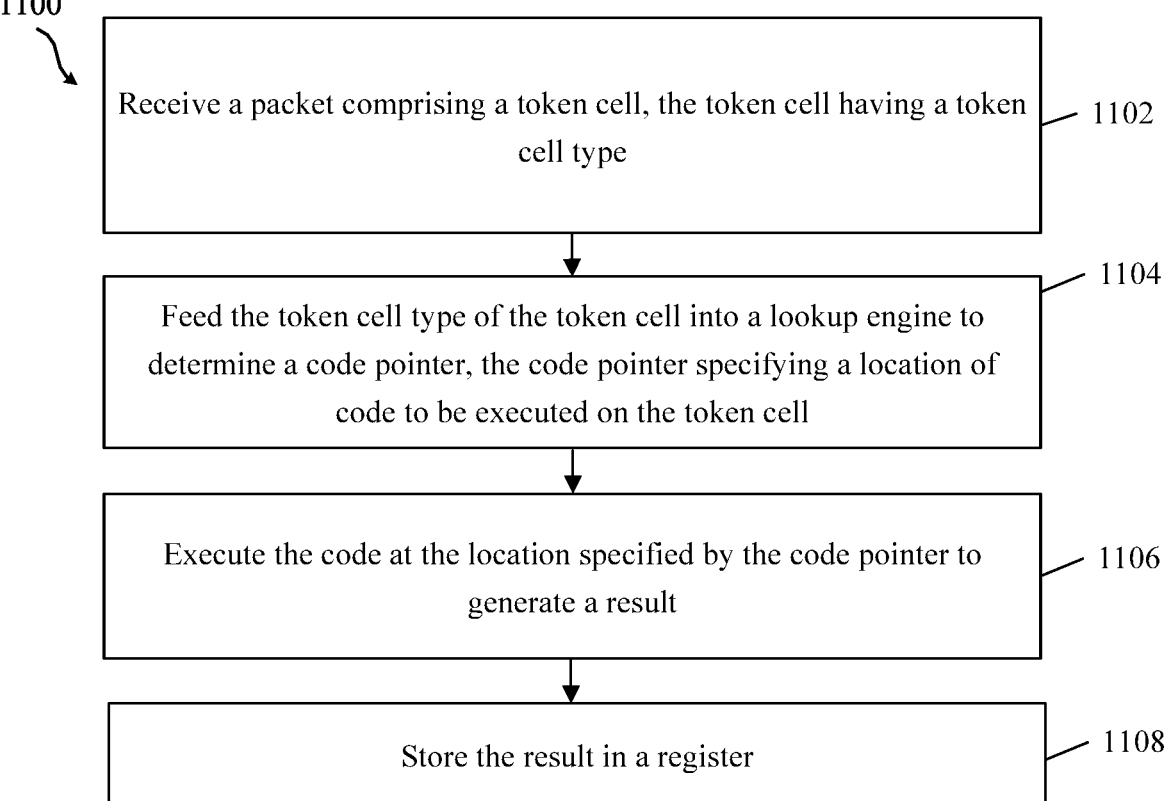
FIG. 11 is a method of token-based networking implemented by a network apparatus in a network.

FIG. 11 is a method 1100 of token-based networking implemented by a network apparatus (e.g., intermediate network node 104) in a network (e.g., network 100). The method 1100 may be implemented to process a packet (e.g., packet 300). In particular, the method 1000 may be implemented in order to facilitate TCR as described herein.

In block 1102, a packet comprising a token cell is received. The token cell has a token cell type. In block 1104, the token cell type of the token cell is fed into a lookup engine to determine a code pointer. The code pointer specifies a location of code to be executed on the token cell (i.e., the code used to process the token cell based on the token type).

In block 1106, the code at the location specified by the code pointer is executed to generate a result. In block 1108, the result is stored in a register.

In an embodiment, a previously-stored result is obtained from the register prior to generating the result, and the previously-stored result is used to generate the result. In an embodiment, the token cell comprises a match zone including the token cell type. In an embodiment, the match zone comprises the token cell type and a prefix to a suffix of a token blob.

In an embodiment, the token cell type and the code pointer are stored in a codepoint registry. In an embodiment, the register is a pipeline state register.

Figures 12A, 12B:
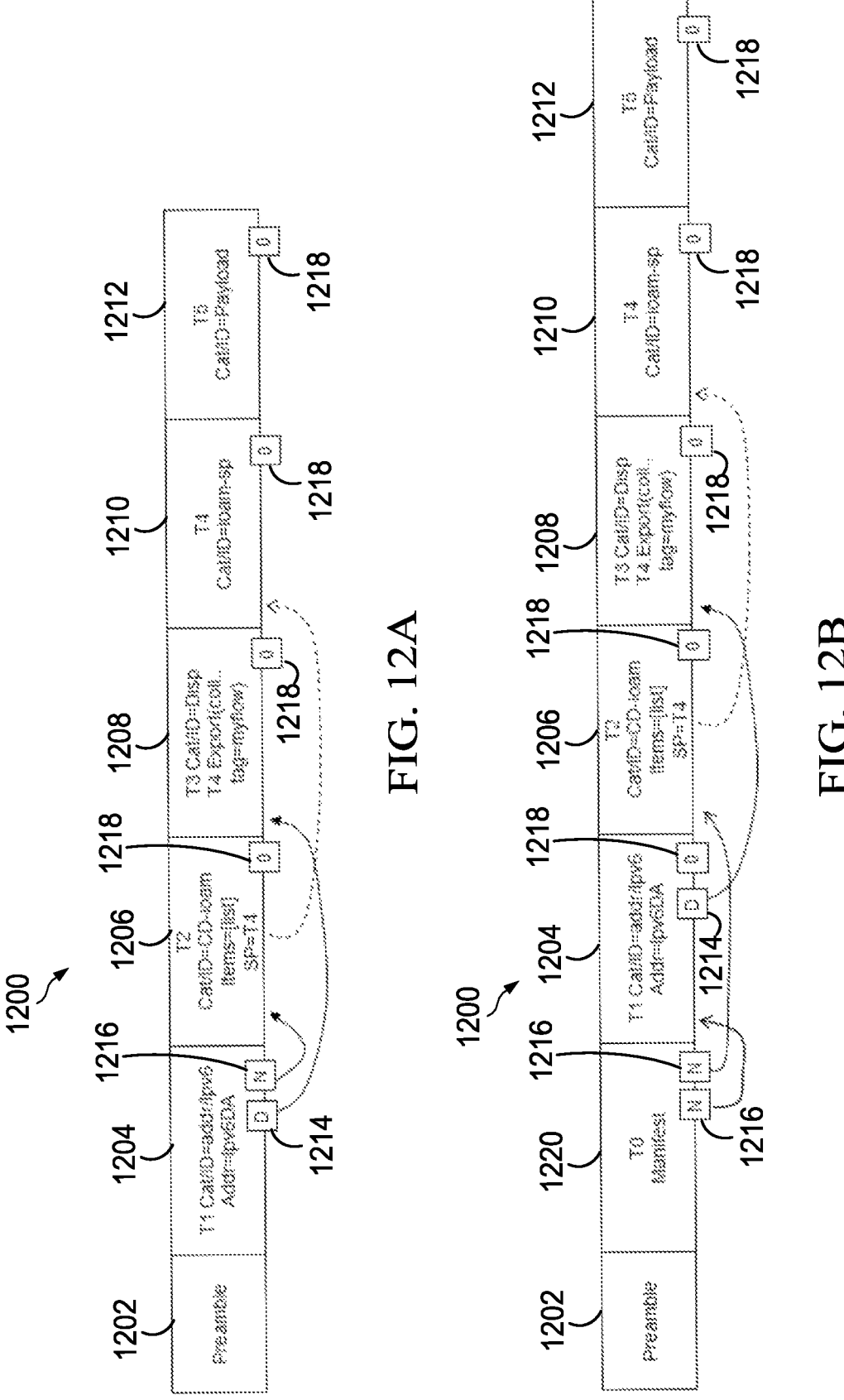
FIG. 12A illustrates an embodiment of processing token cells in a packet in serial fashion utilizing the scratchpad concept.
FIG. 12B illustrates an embodiment of processing token cells in a packet in parallel fashion utilizing the scratchpad concept.

FIG. 12A illustrates an embodiment of processing token cells in a packet 1200 in serial fashion utilizing the scratchpad concept. The packet 1200 may be processed by a node (e.g., internal node 104) in a network (e.g., network 100). As shown, the packet 1200 comprises a preamble 1202, a first token cell 1204, a second token cell 1206, a third token cell 1208, a fourth token cell 1210, and a fifth token cell 1212. In other embodiments, the packet 1200 may include more or fewer token cells.

The preamble 1202 is similar to the preamble 202 in FIG. 2. That is, the preamble 1202 may include a small number of items, such as a version number (e.g., to allow for subsequent iterations of the design) and a hop-count (e.g., as a network safety feature). In an embodiment, the preamble 1202 may contain other information or parameters used to facilitate transport of the packet 1200, to process the packet 1200, to identify structures within the packet 1200, and so on.

After the preamble 1202 has been processed by the node, the node processes the first token cell 1204. The first token cell 1204 includes a next token field 1216 pointing to a location of the second token cell 1206. Therefore, the node processes the second token cell 1206 after the first token cell 1204. The second token cell 1206 has a category of CD-ioam to signify that telemetry data, and in particular In-situ Operations, Administration, and Maintenance (IOAM) data, is to be collected for the listed items. Thus, processing of the second token cell 1206 triggers the collection of the IOAM data. While IOAM data is shown in FIG. 12A, other types of telemetry data may be collected in practical applications to trace the path of the packet and/or capture data at the hops along that path. Other types of data such as SLOs to be taken into account for Quality of Service (QoS) treatment, profiles to apply towards processing a packet, and so on, may also be implicated during the processing of the second token cell.

The second token cell 1206 also includes a scratch pad pointer (e.g., SP=T4). As shown in FIG. 12A, the scratchpad pointer (SP) specifies a location of the scratchpad token cell as the fourth token cell 1210. Therefore, the collected IOAM data is stored in the fourth token cell 1210 as writeable metadata. In an embodiment, the writeable metadata stored in the fourth token cell 1210 may be referenced during the processing of other token cells.

Each of the second token cell 1206 and the fourth token cell 1210 includes a next token field 1218 with the null value signifying that no subsequent token cell to be processed is identified. Therefore, after the IOAM data has been collected and stored, the packet 1200 is forwarded to the next node for further processing.

When the packet 1200 reaches the address identified in the first token cell 1204, the node consults the disposition token cell field 1214. The disposition token cell field 1214 specifies a location of a disposition token cell. In the illustrated example, the disposition token cell field 1214 points to the third token cell 1208. Therefore, after processing the first token cell 1204, the node processes the third token cell 1208.

The third token cell 1208 includes a category/ID of disposition to indicate that the disposition parameters (e.g., Export (coll., tag=myflow) should be carried out by the node. By way of example, the disposition parameters may instruct the node to pop the preamble 1202, the first token cell 1204, the second token cell 1206, and the third token cell 1208 off the packet 1200 and to transmit the fourth token cell 1210 carrying the collected IOAM data and/or the fifth token cell 1212 carrying the payload to another node.

Each of the third token cell 1208 and the fifth token cell 1212 includes a next token field 1218 with the null value signifying that no subsequent token cell to be processed is identified. Therefore, after the collected IOAM data and/or the payload have been transmitted, the packet 1200 is forwarded to the next node for further processing.

FIG. 12B illustrates an embodiment of processing token cells in a packet 1200 in parallel fashion utilizing the scratchpad concept. The packet 1200 may be processed by a node (e.g., internal node 104) in a network (e.g., network 100). As shown, the packet 1200 comprises a preamble 1202, a manifest token cell 1220, a first token cell 1204, a second token cell 1206, a third token cell 1208, a fourth token cell 1210, and a fifth token cell 1212. In other embodiments, the packet 1200 may include more or fewer token cells.

The preamble 1202 is similar to the preamble 202 in FIG. 2. That is, the preamble 1202 may include a small number of housekeeping items, such as a version number (e.g., to allow for subsequent iterations of the design) and a hop-count (e.g., as a network safety feature). In an embodiment, the preamble 1202 may contain other information or parameters used to facilitate transport of the packet 1200, to process the packet 1200, to identify structures within the packet 1200, and so on.

After the preamble 1202 has been processed by the node, the node processes the manifest token cell 1220. In the illustrated example, the manifest token cell 1220 includes next token fields 1216 pointing to a location of the first token cell 1204 and to a location of the second token cell 1206. Thus, the node processes the first token cell 1204 and the second token cell 1206 in parallel after the preamble 1202 has been processed.

The second token cell 1206 has a category of CD-ioam to signify that telemetry data, and in particular IOAM data, is to be collected for the listed items. Thus, processing of the second token cell 1206 triggers the collection of the IOAM data. Despite the illustrated embodiment, other types of telemetry data may be collected in practical applications to trace the path of the packet and/or capture data at the hops along that path.

The second token cell 1206 also includes a scratch pad pointer (e.g., SP=T4). As shown in FIG. 12B, the scratchpad pointer (SP) specifies a location of the scratchpad token cell as the fourth token cell 1210. Therefore, the collected IOAM data is stored in the fourth token cell 1210 as writeable metadata. In an embodiment, the writeable metadata stored in the fourth token cell 1210 may be referenced during the processing of other token cells.

Each of the second token cell 1206 and the fourth token cell 1210 includes a next token field 1218 with the null value signifying that no subsequent token cell to be processed is identified. Therefore, after the IOAM data has been collected and stored, the packet 1200 is forwarded to the next node for further processing.

When the packet 1200 reaches the address identified in the first token cell 1204, the node consults the disposition token cell field 1214. The disposition token cell field 1214 specifies a location of a disposition token cell. In the illustrated example, the disposition token cell field 1214 points to the third token cell 1208. Therefore, after processing the first token cell 1204, the node processes the third token cell 1208.

The third token cell 1208 includes a category/ID of disposition to indicate that the disposition parameters (e.g., Export (coll., tag=myflow) should be carried out by the node. By way of example, the disposition parameters may instruct the node to pop the preamble 1202, the first token cell 1204, the second token cell 1206, and the third token cell 1208 off the packet 1200 and to transmit the fourth token cell 1210 carrying the collected IOAM data and/or the fifth token cell 1212 carrying the payload to another node.

Each of the third token cell 1208 and the fifth token cell 1212 includes a next token field 1218 with the null value signifying that no subsequent token cell to be processed is identified. Therefore, after the collected IOAM data and/or the payload have been transmitted, the packet 1200 is forwarded to the next node for further processing.

Figures 12C, 12D:
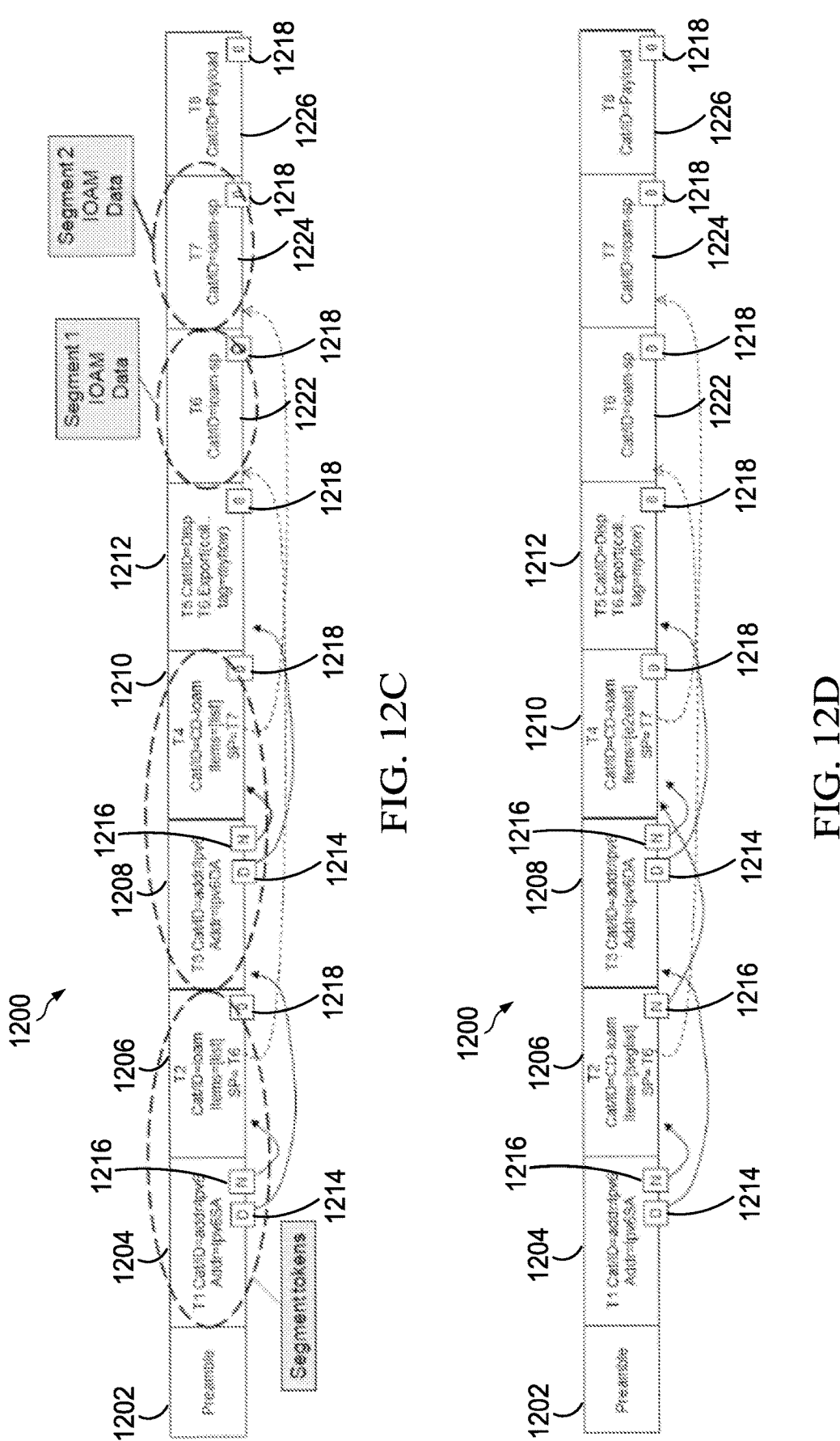
FIG. 12C illustrates an embodiment of processing token cells in a packet in serial fashion utilizing more than one scratchpad.
FIG. 12D illustrates an embodiment of processing token cells in a packet in serial fashion to collect end-to-end telemetry data in one of the scratchpad token cells.

FIG. 12C illustrates an embodiment of processing token cells in a packet 1200 in serial fashion utilizing more than one scratchpad. The packet 1200 may be processed by a node (e.g., internal node 104) in a network (e.g., network 100). As shown, the packet 1200 comprises a preamble 1202, a first token cell 1204, a second token cell 1206, a third token cell 1208, a fourth token cell 1210, a fifth token cell 1212, a six token cell 1222, a seventh token cell 1224, and an eighth token cell 1226. In other embodiments, the packet 1200 may include more or fewer token cells.

The preamble 1202 is similar to the preamble 202 in FIG. 2. That is, the preamble 1202 may include a small number of items, such as a version number (e.g., to allow for subsequent iterations of the design) and a hop-count (e.g., as a network safety feature). In an embodiment, the preamble 1202 may contain other information or parameters used to facilitate transport of the packet 1200, to process the packet 1200, to identify structures within the packet 1200, and so on.

After the preamble 1202 has been processed by the node, the node processes the first token cell 1204. The first token cell 1204 includes a next token field 1216 pointing to a location of the second token cell 1206. Therefore, the node processes the second token cell 1206 after the first token cell 1204. The second token cell 1206 has a category of CD-ioam to signify that telemetry data, and in particular IOAM data, is to be collected for the listed items. Thus, processing of the second token cell 1206 triggers the collection of the IOAM data for a first segment of the path (e.g., path 112). While IOAM data is shown in FIG. 12C, other types of telemetry data may be collected in practical applications to trace the path of the packet and/or capture data at the hops along that path. Other types of data such as SLOs to be taken into account for Quality of Service (QoS) treatment, profiles to apply towards processing a packet, and so on, may also be implicated during the processing of the second token cell 1206.

The second token cell 1206 also includes a scratch pad pointer (e.g., SP=T6). As shown in FIG. 12C, the scratchpad pointer (SP) specifies a location of the first scratchpad token cell as the sixth token cell 1222. Therefore, the collected IOAM data for the first segment of the path is stored in the sixth token cell 1222 as writeable metadata. In an embodiment, the writeable metadata stored in the sixth token cell 1222 may be referenced during the processing of other token cells.

Each of the second token cell 1206 and the sixth token cell 1222 includes a next token field 1218 with the null value signifying that no subsequent token cell to be processed is identified. Therefore, after the IOAM data has been collected and stored for the first segment, the packet 1200 is forwarded to the next node for further processing.

When the packet 1200 reaches the address identified in the first token cell 1204, the node consults the disposition token cell field 1214. The disposition token cell field 1214 specifies a location of a disposition token cell. In the illustrated example, the disposition token cell field 1214 points to the third token cell 1208. Therefore, after processing the first token cell 1204, the node processes the third token cell 1208. In an embodiment, the first token cell 1204 and the second token cell 1206 are popped off the packet 1200 by the node when the third token cell 1208 is processed.

The third token cell 1208 includes a next token field 1216 pointing to a location of the fourth token cell 1210. Therefore, the node processes the fourth token cell 1210 after the third token cell 1208. The fourth token cell 1210 has a category of CD-ioam to signify that telemetry data, and in particular IOAM data, is to be collected for the listed items. Thus, processing of the fourth token cell 1210 triggers the collection of the IOAM data for a second segment of the path. While IOAM data is shown in FIG. 12C, other types of telemetry data may be collected in practical applications to trace the path of the packet and/or capture data at the hops along that path. Other types of data such as SLOs to be taken into account for Quality of Service (QoS) treatment, profiles to apply towards processing a packet, and so on, may also be implicated during the processing of the fourth token cell 1210.

The fourth token cell 1210 also includes a scratch pad pointer (e.g., SP=T7). As shown in FIG. 12C, the scratchpad pointer (SP) specifies a location of the second scratchpad token cell as the seventh token cell 1224. Therefore, the collected IOAM data for the second segment of the path is stored in the seventh token cell 1224 as writeable metadata. In an embodiment, the writeable metadata stored in the seventh token cell 1224 may be referenced during the processing of other token cells.

Each of the fourth token cell 1210 and the seventh token cell 1224 includes a next token field 1218 with the null value signifying that no subsequent token cell to be processed is identified. Therefore, after the IOAM data has been collected and stored for the second segment, the packet 1200 is forwarded to the next node for further processing.

When the packet 1200 reaches the address identified in the third token cell 1208, the node consults the disposition token cell field 1214. The disposition token cell field 1214 specifies a location of a disposition token cell. In the illustrated example, the disposition token cell field 1214 points to the fifth token cell 1212. Therefore, after processing the third token cell 1208, the node processes the fifth token cell 1212. In an embodiment, the third token cell 1208 and the fourth token cell 1210 are popped off the packet 1200 by the node at about the same time as the fifth token cell 1212 is processed.

The fifth token cell 1212 includes a category/ID of disposition to indicate that the disposition parameters (e.g., Export (coll., tag=myflow) should be carried out by the node. By way of example, the disposition parameters may instruct the node to transmit the sixth token cell 1222 carrying the collected IOAM data for the first segment, the seventh token cell 1224 carrying the collected IOAM data for the second segment, and the eighth token cell 1226 carrying the payload to another node or nodes.

Each of the fifth token cell 1212 and the eighth token cell 1226 includes a next token field 1218 with the null value signifying that no subsequent token cell to be processed is identified. Therefore, after the collected IOAM data and/or the payload have been transmitted, the packet 1200 is forwarded to the next node for further processing.

FIG. 12D illustrates an embodiment of processing token cells in a packet 1200 in serial fashion to collect end-to-end telemetry data in one of the scratchpad token cells. The processing of the packet 1200 in FIG. 12D is similar to the processing of the packet 1200 in FIG. 12C. Therefore, the similar processing steps will not be repeated. One difference, however, is that the second token cell 1206 in FIG. 12D includes a next token cell field 1216 signifying a location of a next token cell instead having a null token cell field 1218 including a null value. Another difference is that the fourth token cell 1210 specifies that IOAM data is to be collected for an end-to-end list (e.g., [e2elist]) instead for a segment list (e.g., [list]).

In light of the noted differences, the fourth token cell 1210 is processed after the second token cell 1206. Pursuant to processing the fourth token cell 1210, the IOAM data is collected for as specified by the end-to-end list. The fourth token cell 1210 also includes a scratch pad pointer (e.g., SP=T7). As shown in FIG. 12D, the scratchpad pointer (SP) specifies a location of the second scratchpad token cell as the seventh token cell 1224. Therefore, the collected IOAM data for the end-to-end telemetry is stored in the seventh token cell 1224 as writeable metadata.

While FIGS. 12A-12D illustrate one example of processing token cells in a packet 1200 utilizing the scratchpad concept, the order and type of token cells in packets may be different in practical applications. That is, the scope of the present disclosure should not be limited to the illustrated example.

Figure 13:
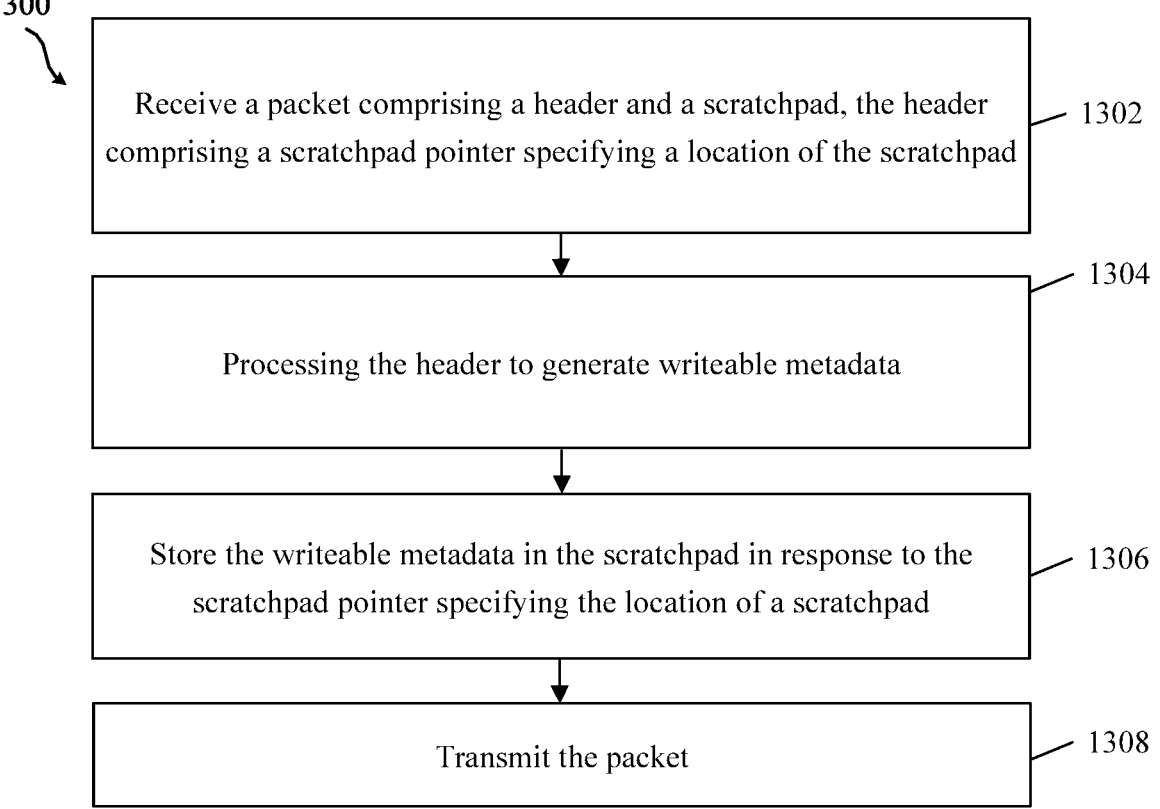
FIG. 13 is a method of token-based networking implemented by a network apparatus in a network.

FIG. 13 is a method 1300 of token-based networking implemented by a network apparatus (e.g., intermediate network node 104) in a network (e.g., network 100). The method 1300 may be implemented to transport a packet (e.g., packet 300) along a path (e.g., path 112) in the network. In particular, the method 1300 may be implemented in order to facilitate TCR as described herein.

In block 1302, a packet (e.g., packet 1200 in FIG. 12A) comprising a header and a scratchpad is received. In an embodiment, the header comprises a token cell. In an embodiment, the scratchpad comprises a scratchpad token cell (e.g., the fourth token cell 1210 in FIG. 12A). The header comprises a scratchpad pointer (e.g., SP in FIG. 12A) specifying a location of the scratchpad.

In an embodiment, the packet includes a second token cell disposed between the token cell and the scratchpad token cell. In an embodiment, the packet includes a second token cell comprising a second scratchpad pointer specifying the location of the scratchpad token cell.

In block 1304, the header is processed to generate writeable metadata. In block 1306, the writeable metadata is stored in the scratchpad in response to the scratchpad pointer specifying the location of a scratchpad. In block 1308, the packet is forwarded.

In an embodiment, the method 1300 further includes processing a second token cell, and referencing the writeable metadata stored in the scratchpad when processing the second token cell.

In an embodiment, the packet comprises a second token cell comprising a second scratchpad pointer specifying a location of a second scratchpad token cell storing additional writeable metadata. The writeable metadata comprises a first set of telemetry data corresponding to a first segment of a path traversed by the packet, and the additional writeable metadata comprises a second set of telemetry data corresponding to a second segment of the path traversed by the packet.

In an embodiment, the packet comprises a second token cell comprising a second scratchpad pointer specifying a location of a second scratchpad token cell storing additional writeable metadata. The writeable metadata comprises a first set of telemetry data corresponding to an end-to-end (E2E) path traversed by the packet, and the additional writeable metadata comprises a second set of telemetry data corresponding to a segment of the E2E path traversed by the packet.

Figure 14:
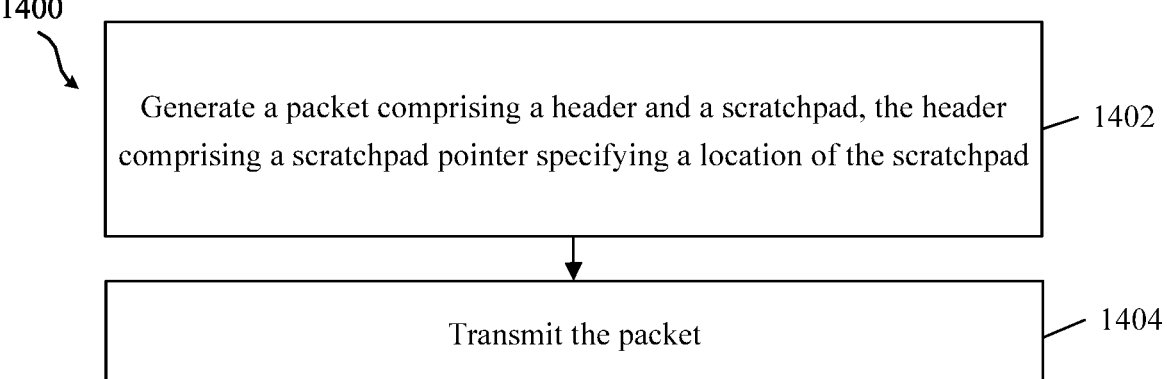
FIG. 14 is a method of token-based networking implemented by a network apparatus in a network.

FIG. 14 is a method 1400 of token-based networking implemented by a network apparatus (e.g., edge node 102) in a network (e.g., network 100). The method 1400 may be implemented to generate a packet (e.g., packet 300) for transport along a path (e.g., path 112) in the network. In particular, the method 1400 may be implemented in order to facilitate TCR as described herein.

In block 1402, a packet comprising a header and a scratchpad is generated. The header comprises a scratchpad pointer (e.g., SP in FIG. 12A) specifying a location of the scratchpad. In block 1404, the packet is transmitted. The packet may be transmitted toward, for example, another network node (e.g., internal node 104).

In an embodiment, the packet includes a second header disposed between the header and the scratchpad. In an embodiment, the packet includes a second header comprising a second scratchpad pointer specifying the location of the scratchpad.

In an embodiment, the packet comprises a second header comprising a second scratchpad pointer specifying a location of a second scratchpad storing additional writeable metadata. The writeable metadata comprises a first set of telemetry data corresponding to a first segment of a path traversed by the packet. The additional writeable metadata comprises a second set of telemetry data corresponding to a second segment of the path traversed by the packet.

In an embodiment, the packet comprises a second header comprising a second scratchpad pointer specifying a location of a second header storing additional writeable metadata. The writeable metadata comprises a first set of telemetry data corresponding to an end-to-end (E2E) path traversed by the packet. The additional writeable metadata comprises a second set of telemetry data corresponding to a segment of the E2E path traversed by the packet. In an embodiment, the writeable metadata comprises iOAM data or other telemetry data.

Figure 15:
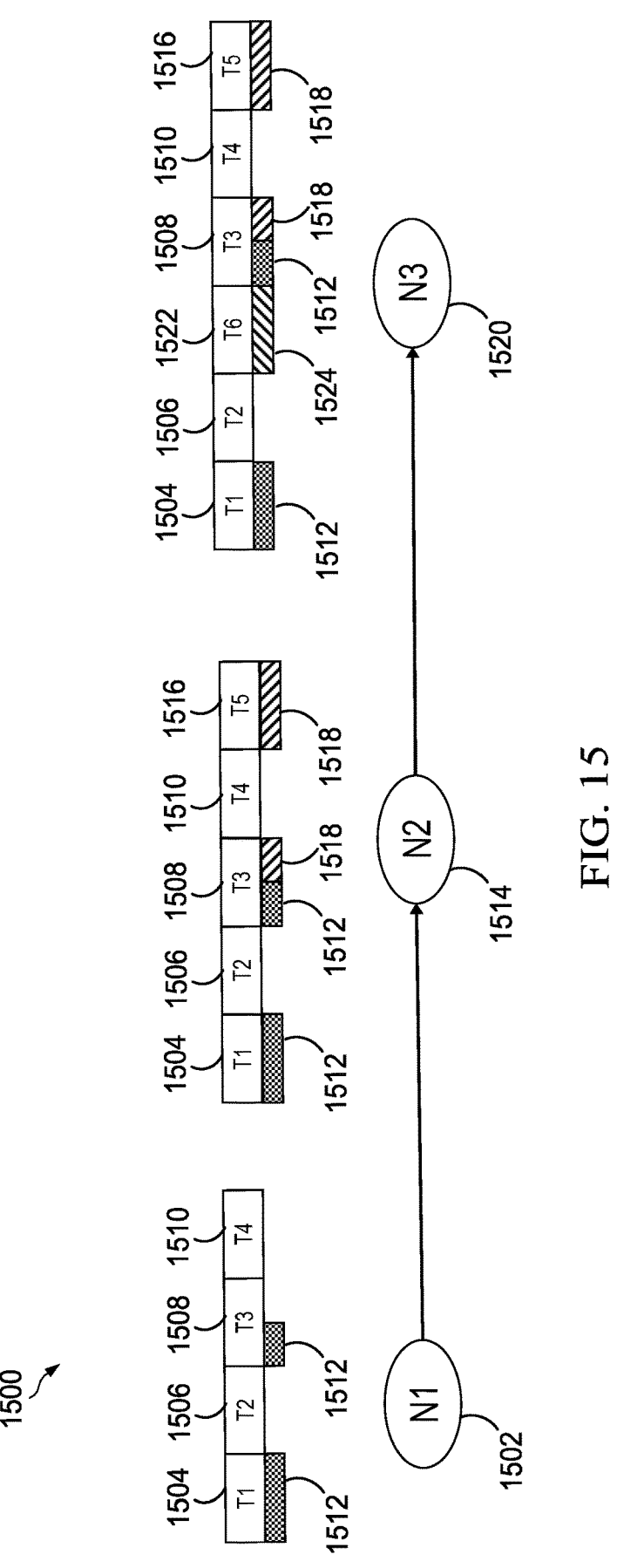
FIG. 15 illustrates an embodiment of securing token cells, or portions thereof, within a packet by applying a signature.

FIG. 15 illustrates an embodiment of securing token cells, or portions thereof, within a packet 1500 by applying a signature. As used herein, the signature provides a way for a node (e.g., internal node 104) in a network (e.g., network 100) to secure the token cell, of portion thereof, while still permitting the token cell to be manipulated by other nodes along a path (e.g., path 112). That is, the token cells are signed, but not encrypted. As will be more fully explained below, different nodes are able to sign different token cells in the same packet. In addition, different nodes are able to sign different portions of the same token cell. This allows nodes to verify the authenticity of the contents of a token cell, regardless of which node added the contents.

As shown, the packet 1500 is initially processed by a first node 1502. The packet 1500 includes a first token cell 1504, a second token cell 1506, a third token cell 1508, and a fourth token cell 1510. In other embodiments, the packet 1500 may include more or fewer token cells. Each of the first token cell 1504, the second token cell 1506, the third token cell 1508, and the fourth token cell 1510 may be one of the token cells described herein (i.e., may have one of the token cell types described herein).

The first node 1502 applies a first signature 1512 to the first token cell 1504 and a portion of the third token cell 1508. The first signature 1512 verifies the authenticity of the first token cell 1504 and the portion of the third token cell 1508. However, the first signature 1512 does not encrypt the first token cell 1504 or the portion of the third token cell 1508. Each of the first token cell 1504, the second token cell 1506, the third token cell 1508, and the fourth token cell 1510 may be one of the token cells described herein (i.e., may have one of the token cell types described herein). Once the first signature 1512 has been applied, the first node 1502 transmits the packet 1500 on to a second node 1514.

The packet 1500 is then processed by the second node 1514. As shown, the packet 1500 still includes the first token cell 1504, the second token cell 1506, the third token cell 1508, and the fourth token cell 1510. However, in the illustrated embodiment the second node 1514 has added a fifth token cell 1516 to the packet 1500 during processing. The fifth token cell 1516 may be one of the token cells described herein (i.e., may have one of the token cell types described herein).

The second node 1514 applies a second signature 1518 to another portion of the third token cell 1508 and the fifth token cell 1516. The second signature 1518 verifies the authenticity of the other portion of the third token cell 1508 and the fifth token cell 1516. Once the second signature 1518 has been applied, the second node 1514 transmits the packet 1500 on to a third node 1520.

The packet 1500 is then processed by the third node 1520. As shown, the packet 1500 still includes the first token cell 1504, the second token cell 1506, the third token cell 1508, the fourth token cell 1510, and the fifth token cell 1516. However, in the illustrated embodiment the third node 1520 has added a sixth token cell 1552 to the packet 1500 during processing. The sixth token cell 1522 may be one of the token cells described herein (i.e., may have one of the token cell types described herein). As shown, the sixth token cell 1522 has been inserted into the packet between the second token cell 1506 and the third token cell 1508.

The third node 1520 applies a third signature 1524 to the sixth token cell 1522. The third signature 1524 verifies the authenticity of the sixth token cell 1522. Once the third signature 1524 has been applied, the third node 1520 is able to transmit the packet 1500 on toward another node in the network, where the process of verifying tokens may continue in a similar fashion.

Figure 16:
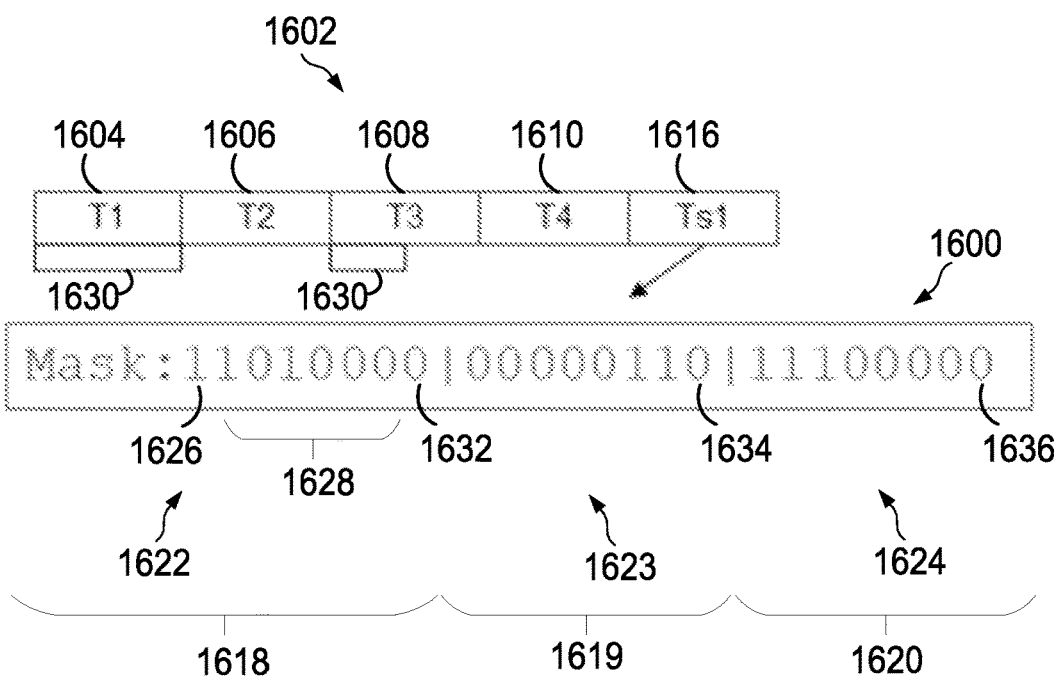
FIG. 16 illustrates an embodiment of a signature mask that identifies which token cells, or portions thereof, have been signed by a first node.

FIG. 16 illustrates an embodiment of a signature mask 1600 that identifies which token cells, or portions thereof, have been signed by a first node (e.g., an internal node 104). That is, the signature mask 1600 allows non-contiguous token cells, or portions thereof, to be signed in the manner illustrated in FIG. 15.

As shown in FIG. 16, a packet 1602 includes a first token cell 1604, a second token cell 1606, a third token cell 1608, a fourth token cell 1610, and a security token cell 1616. The security token cell 1616 carries or includes an identity of the node that generated the signature mask 1600, the signature mask 1600 itself, and signature mask material. In an embodiment, the signature mask material comprises a security type, a key identifier (ID), and a hash result. The security type identifies a version of the signature method being used. The key ID allows for more than one key to be made available and for a new key to be handed over without disruption. The hash result represents a cryptographic signature. As used herein, signing refers to the process of taking material to be signed, often performing a hash function, then applying a mathematical transformation to the hash using the signer's private key, which is basically encrypting the hash and adding the signer's identity to the packet. A receiver of the packet can subsequently decrypt the payload using the signer's public key, or decrypt the hash and compare the decrypted hash against the hash of the material. If, and only if, the decrypted hash and hash are the same, the material is authentic.

In an embodiment, the signature mask 1600 includes a token mask 1618, a first word mask 1619, and a second word mask 1620. The token mask 1618 comprises one or more octets, such as a first octet 1622. The first octet 1622 includes a position indicator 1626. In an embodiment, the position indicator 1626 is bit one of the first octet 1622. The position indicator 1626 indicates whether a position of the one or more tokens is absolute, or is relative to a position of the security token cell, which in the illustrated embodiment is the security token cell 1616. That is, when the position indicator 1626 is set (e.g., has a value of one), a determination of which token cells have been signed starts from the first token cell 1604 of the packet 1602. When the position indicator 1626 is not set (e.g., has a value of zero), a determination of which token cells have been signed starts from the security token cell.

The first octet 1622 also includes a mask 1628. In an embodiment, the mask 1628 comprises bits two through seven of the first octet 1622. The mask 1628 identifies which of the first six token cells in a packet 1602 have been signed. In the illustrated embodiment, bit two and bit four within the mask 1628 are set (e.g., have a value of one), while bit three, bit five, bit six, and bit seven are not set (e.g., have a value of zero).

Bit two and bit four being set signifies that a signature 1630 has been applied to the first token cell 1604 and to the third token cell 1608 in the packet 1602. The third bit, the fifth bit, the sixth bit, and the seventh bit not being set signifies that no signature has been applied to the second token cell 1606, the fourth token cell 1610, the security token cell 1616, or a sixth token cell (not shown since the packet 1600 in the illustrated embodiment of FIG. 16 does not include a sixth token cell). It should be appreciated that the various bits in the mask 1628 may be set or not in other patterns in practical applications to signify which of the token cells bear a signature.

The first octet 1622 also includes a next indicator 1632 (a.k.a., a next octet indicator). In an embodiment, the next indicator 1632 is bit eight of the first octet 1622. The next indicator 1632 indicates whether a subsequent octet follows the first octet 1622 in the token mask 1618. When the next indicator 1632 is set (e.g., has a value of one), another octet that includes a position indicator, a mask, and a next indicator corresponding to token cells seven through thirteen (not shown) follows the first octet 1622 in the token mask 1618. When the next indicator 1632 is not set (e.g., has a value of zero), another octet including a position indicator, a mask, and a next indicator does not follow the first octet 1622. The process of setting next indicators to signify that additional octets having a position indicator, a mask, and a next indicator may be repeated to accommodate all of the token cells in a packet.

In the illustrated embodiment of FIG. 16, the next indicator 1632 is not set. Therefore, the first octet 1622 is followed by the first word mask 1619. The first word mask 1619 comprises one or more octets, such as a second octet 1623. The second octet 1623 provides an indication of which of the token cells have been partially signed. In an embodiment, bits one through seven are used to provide the indication. In the illustrated embodiment, bits one through five are not set (e.g., have a value of zero) and bit six and bit seven are set (e.g., have a value of one). This configuration of ones and zeros represents the binary number 0000011, which in decimal represents the number 3. Therefore, the second octet 1623 indicates that the third token cell 1608 has been partially signed.

The second octet 1623 also includes a next indicator 1634 (a.k.a., a next octet indicator). In an embodiment, the next indicator 1634 is bit eight of the second octet 1623. The next indicator 1634 indicates whether a subsequent octet follows the second octet 1623 in the first word mask 1619. When the next indicator 1634 is set (e.g., has a value of one), another octet that includes a binary number representation used to identify another partially signed token cell follows the second octet 1623. When the next indicator 1634 is not set (e.g., has a value of zero), another octet includes a binary number representation used to identify another partially signed token cell does not follow the second octet 1623. The process of setting next indicators to signify that additional octets having binary representations used to identify another partially signed token cell may be repeated to accommodate all of the partially signed token cells in a packet.

In the illustrated embodiment of FIG. 16, the next indicator 1632 is not set. Therefore, the second octet 1623 is followed by the second word mask 1620. The second word mask 1620 comprises one or more octets, such as a third octet 1624. The third octet 1624 provides an indication of which portion of a token cell has been partially signed. In an embodiment, bits one through seven are used to provide the indication. In the illustrated embodiment, bits one through three are set (e.g., have a value of one) and bits four through seven are not set (e.g., have a value of zero). This configuration of ones and zeros represents that the first three words of the third token cell 1608 have been signed, and that the last five words of the third token cell 1608 have not been signed. That is, the first ninety-six bits of the third token cell 1608 have been signed in the illustrated embodiment (e.g., the first 3 words×4 octets per word×8 bits per octet).

Other methods of providing the indication of which portion of a token cell has been partially signed may be used. For example, bits one through four may be used to provide an offset indicating where a signature applied to a token cell begins and bits five through eight may be used to specify a length of that signature.

The third octet 1624 also includes a next indicator 1636 (a.k.a., a next octet indicator). In an embodiment, the next indicator 1636 is bit eight of the third octet 1624. The next indicator 1636 indicates whether a subsequent octet follows the third octet 1624 in the second word mask 1620. When the next indicator 1636 is set (e.g., has a value of one), another octet that indicates which portion of a token cell has been partially signed follows the third octet 1624 in the second word mask 1620. When the next indicator 1636 is not set (e.g., has a value of zero), another octet indicating which portion of the one or more token cells has been partially signed does not follow the third octet 1624. The process of setting next indicators to signify which portion of a token cell has been partially signed may be repeated to accommodate all of the token cells in a packet.

Figure 17:
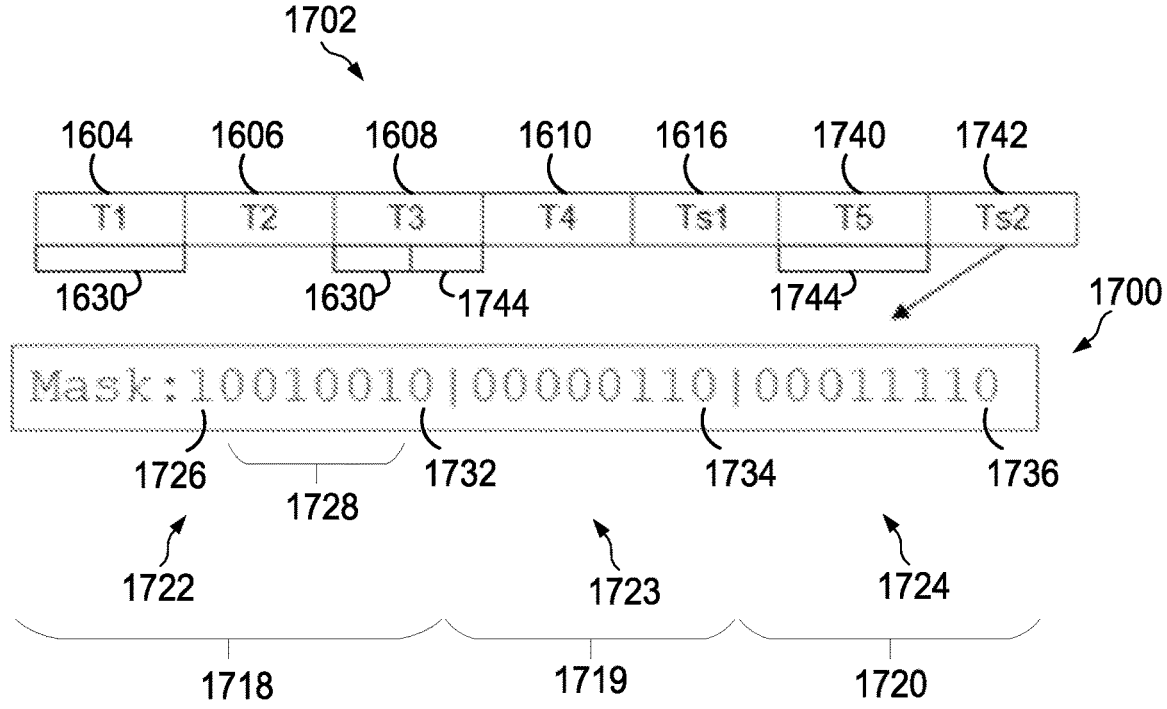
FIG. 17 illustrates an embodiment of a signature mask that identifies which token cells, or portions thereof, have been signed by a second node.

FIG. 17 illustrates an embodiment of a signature mask 1700 that identifies which token cells, or portions thereof, have been signed by a second node (i.e., a node other than the node that signed packet 1602 in FIG. 16). Because the manner in which the signature mask 1700 identifies which token cells, or portions thereof, have been signed is similar to the manner in which the signature mask 1600 of FIG. 16 performs this function, some details have been omitted for the sake of brevity.

As shown in FIG. 17, a packet 1702 includes the first token cell 1604, the second token cell 1606, the third token cell 1608, the fourth token cell 1610, and the security token cell 1616. The packet 1702 also includes a fifth token cell 1740 and a second security token cell 1742. The second security token cell 1742 carries or includes an identity of the node that generated the signature mask 1700, the signature mask 1700 itself, and the signature mask material. In an embodiment, the signature mask 1700 includes a token mask 1718, a first word mask 1719, and a second word mask 1720.

The token mask 1718 comprises one or more octets, such as a first octet 1722. In the first octet 1772, the position indicator 1726 is set (e.g., has a value of one). As such, the determination of which token cells have been signed starts from the first token cell 1604 of the packet 1602. The first octet 1722 also includes a mask 1728. In an embodiment, the mask 1728 comprises bits two through seven of the first octet 1722. In the illustrated embodiment, bit four and bit seven within the mask 1728 are set (e.g., have a value of one), while the other bits are not set (e.g., have a value of zero). Bit four and bit seven being set signifies that a signature 1744 has been applied to the third token cell 1608 and to the fifth token cell 1740 in the packet 1602. The other bits not being set signifies that no signature has been applied to the other token cells. It should be appreciated that the various bits in the mask 1728 may be set or not in other patterns in practical applications to signify which of the token cells bear a signature.

The first octet 1722 also includes a next indicator 1732 that has not been set. This indicates that the first octet 1722 is followed by the first word mask 1719. The first word mask 1719 comprises one or more octets, such as a second octet 1723. In the illustrated embodiment, bits one through five are not set (e.g., have a value of zero) and bit six and bit seven are set (e.g., have a value of one). This configuration of ones and zeros represents the binary number 0000011, which in decimal represents the number 3. Therefore, the second octet 1723 indicates that the third token cell 1708 has been partially signed.

The second octet 1723 also includes a next indicator 1734 that has not been set. This indicates that the second octet 1723 is followed by the second word mask 1720. The second word mask 1720 comprises one or more octets, such as a third octet 1724. In the illustrated embodiment, bits one through three are not set and bits four through seven are set. This configuration of ones and zeros represents that the fourth, fifth, sixth, and seventh words of the third token cell 1608 have been signed. That is, the last one hundred twenty-eight bits of the third token cell 1608 have been signed in the illustrated embodiment (e.g., the last 4 words×4 octets per word×8 bits per octet).

The third octet 1724 also includes a next indicator 1736. In an embodiment, the next indicator 1736 that has not been set. Therefore, another octet indicating which portion of the one or more token cells has been partially signed does not follow the third octet 1724.

Figures 18, 19:
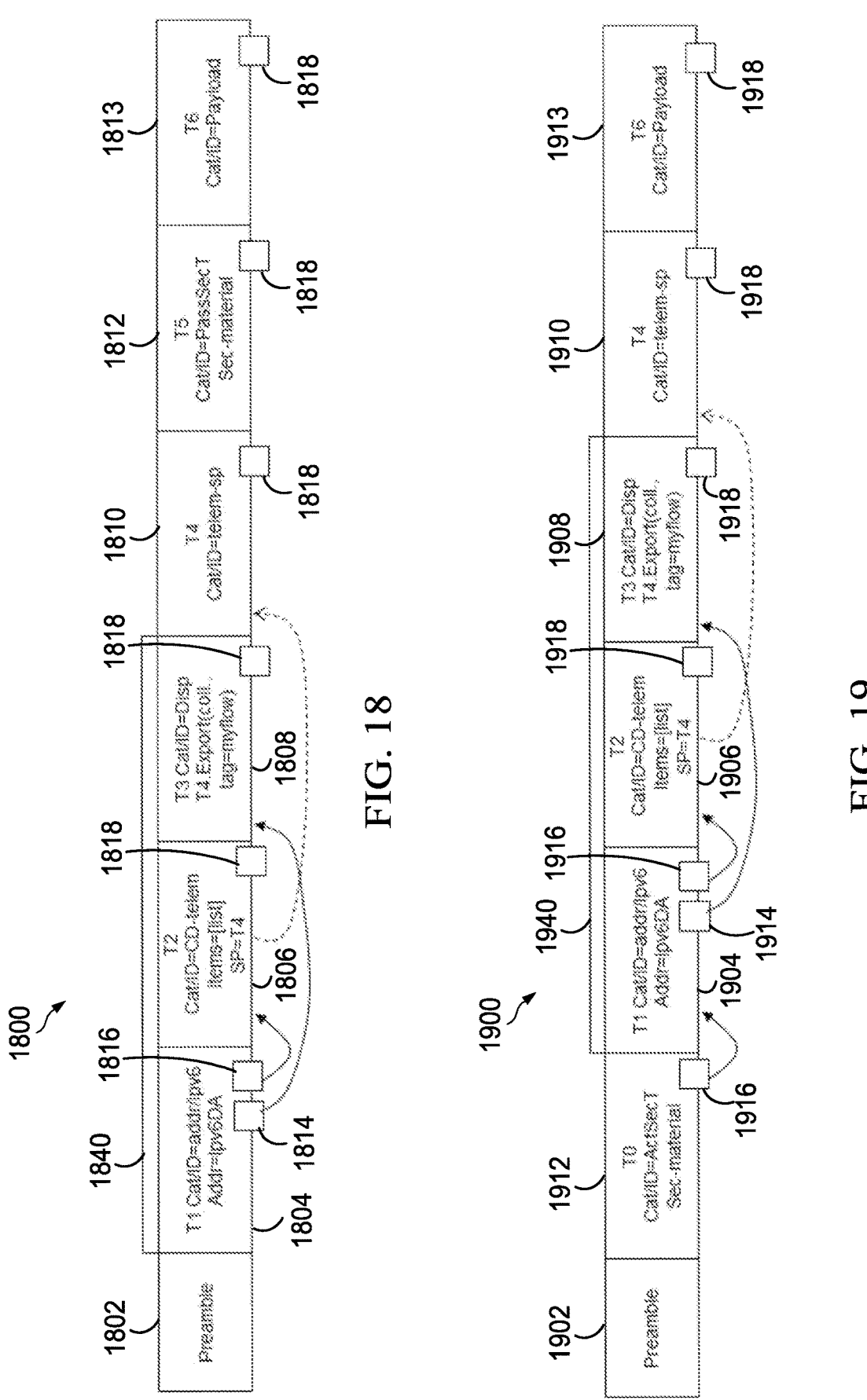
FIG. 18 illustrates an embodiment of processing token cells in a packet in serial fashion utilizing the signature concept.
FIG. 19 illustrates an embodiment of processing token cells in a packet in serial fashion utilizing an active signature concept.

FIG. 18 illustrates an embodiment of processing token cells in a packet 1800 in serial fashion utilizing the signature concept. The packet 1800 may be processed by a node (e.g., internal node 104) in a network (e.g., network 100). As shown, the packet 1800 comprises a preamble 1802, a first token cell 1804, a second token cell 1806, a third token cell 1808, a fourth token cell 1810, a security token cell 1812 (i.e., a fifth token cell), and a sixth token cell 1813. In other embodiments, the packet 1800 may include more or fewer token cells.

As shown, the first token cell 1804, the second token cell 1806, and the third token cell 1808 have been authenticated by a signature 1840. In an embodiment, the signature 1840 is applied to the first token cell 1804, the second token cell 1806, and the third token cell 1808 by the node processing the packet 1800. In an embodiment, the signature 1840 is referenced by the node processing the packet 1800 to verify the authenticity of the first token cell 1804, the second token cell 1806, and the third token cell 1808.

In an embodiment, the security token cell 1812 carries or includes an identity of the node that generated a signature mask, the signature mask itself, and signature mask material corresponding to the signature 1840.

The preamble 1802 is similar to the preamble 202 in FIG. 2. After the preamble 1802 has been processed by the node, the node processes the first token cell 1804. The first token cell 1804 includes a next token field 1816 pointing to a location of the second token cell 1806. Therefore, the node processes the second token cell 1806 after the first token cell 1804. The second token cell 1806 has a category of CD-telem to signify that telemetry data is to be collected for the listed items. Thus, processing of the second token cell 1806 triggers the collection of the telemetry data.

The second token cell 1806 also includes a scratch pad pointer (e.g., SP=T4). As shown in FIG. 18, the scratchpad pointer (SP) specifies a location of the scratchpad token cell as the fourth token cell 1810. Therefore, the collected telemetry data is stored in the fourth token cell 1810 as writeable metadata. In an embodiment, the writeable metadata stored in the fourth token cell 1810 may be referenced by other nodes when the packet 1800 is processed.

Each of the second token cell 1806 and the fourth token cell 1810 includes a next token field 1818 with the null value signifying that no subsequent token cell to be processed is identified. Therefore, after the telemetry data has been collected and stored, the packet 1800 is forwarded to the next node for further processing.

When the packet 1800 reaches the address identified in the first token cell 1804, the node consults the disposition token cell field 1814. The disposition token cell field 1814 specifies a location of a disposition token cell. In the illustrated example, the disposition token cell field 1814 points to the third token cell 1808. Therefore, after processing the first token cell 1804, the node processes the third token cell 1808.

The third token cell 1808 includes a category/ID of disposition to indicate that the disposition parameters (e.g., Export (coll., tag=myflow) should be carried out by the node. By way of example, the disposition parameters may instruct the node to pop the preamble 1802, the first token cell 1804, the second token cell 1806, and the third token cell 1808 off the packet 1800 and to transmit the fourth token cell 1810 carrying the collected telemetry data, the security token cell 1812, and/or the sixth token cell 1813 carrying the payload to another node. In an embodiment, the security token cell 1812 may also be removed from the packet 1800 prior to transmission.

Each of the third token cell 1808, the security token cell 1812, and the sixth token cell 1813 includes a next token field 1818 with the null value signifying that no subsequent token cell to be processed is identified. Therefore, after the collected telemetry data and/or the payload have been transmitted, the packet 1800 is forwarded to the next node for further processing.

FIG. 19 illustrates an embodiment of processing token cells in a packet 1900 in serial fashion utilizing an active signature concept. The packet 1900 may be processed by a node (e.g., internal node 104) in a network (e.g., network 100). As shown, the packet 1900 comprises a preamble 1902, a security token cell 1912, a first token cell 1904, a second token cell 1906, a third token cell 1908, a fourth token cell 1910, and a sixth token cell 1913. In other embodiments, the packet 1800 may include more or fewer token cells.

The preamble 1902 is similar to the preamble 202 in FIG. 2. After the preamble 1902 has been processed by the node, the node processes the security token cell 1912. The security token cell 1912 instructs the node to verify the authenticity of the signed token cells when processing the packet 1900. Because of its position within the packet 1900, the security token cell 1912 may be referred to as an active security token cell. In an embodiment, the security token cell 1912 carries or includes an identity of the node that generated a signature mask, the signature mask itself, and signature mask material corresponding to the signature 1940.

The security token cell 1912 includes a next token field 1916 pointing to a location of the first token cell 1904. Therefore, the node processes the first token cell 1904 after the security token cell 1912. As part of that processing, the node verifies the authenticity of the first token cell 1904 based on the signature 1940.

The first token cell 1904 includes a next token field 1916 pointing to a location of the second token cell 1906. Therefore, the node processes the second token cell 1906 after the first token cell 1904. As part of that processing, the node verifies the authenticity of the second token cell 1906 based on the signature 1940. The second token cell 1906 has a category of CD-telem to signify that telemetry data is to be collected for the listed items. Thus, processing of the second token cell 1906 triggers the collection of the telemetry data.

The second token cell 1906 also includes a scratch pad pointer (e.g., SP=T4). As shown in FIG. 19, the scratchpad pointer (SP) specifies a location of the scratchpad token cell as the fourth token cell 1910. Therefore, the collected telemetry data is stored in the fourth token cell 1910 as writeable metadata. In an embodiment, the writeable metadata stored in the fourth token cell 1910 may be referenced by other nodes when the packet 1900 is processed.

Each of the second token cell 1906 and the fourth token cell 1910 includes a next token field 1918 with the null value signifying that no subsequent token cell to be processed is identified. Therefore, after the telemetry data has been collected and stored, the packet 1900 is forwarded to the next node for further processing.

When the packet 1900 reaches the address identified in the first token cell 1904, the node consults the disposition token cell field 1914. The disposition token cell field 1914 specifies a location of a disposition token cell. In the illustrated example, the disposition token cell field 1914 points to the third token cell 1908. Therefore, after processing the first token cell 1904, the node processes the third token cell 1908.

The third token cell 1908 includes a category/ID of disposition to indicate that the disposition parameters (e.g., Export (coll., tag=myflow) should be carried out by the node. By way of example, the disposition parameters may instruct the node to pop the preamble 1902, the security token cell 1912, the first token cell 1904, the second token cell 1906, and the third token cell 1908 off the packet 1900 and to transmit the fourth token cell 1910 carrying the collected telemetry data and/or the sixth token cell 1913 carrying the payload to another node.

Each of the third token cell 1908 and the sixth token cell 1913 includes a next token field 1918 with the null value signifying that no subsequent token cell to be processed is identified. Therefore, after the collected telemetry data and/ or the payload have been transmitted, the packet 1900 is forwarded to the next node for further processing.

Figure 20:
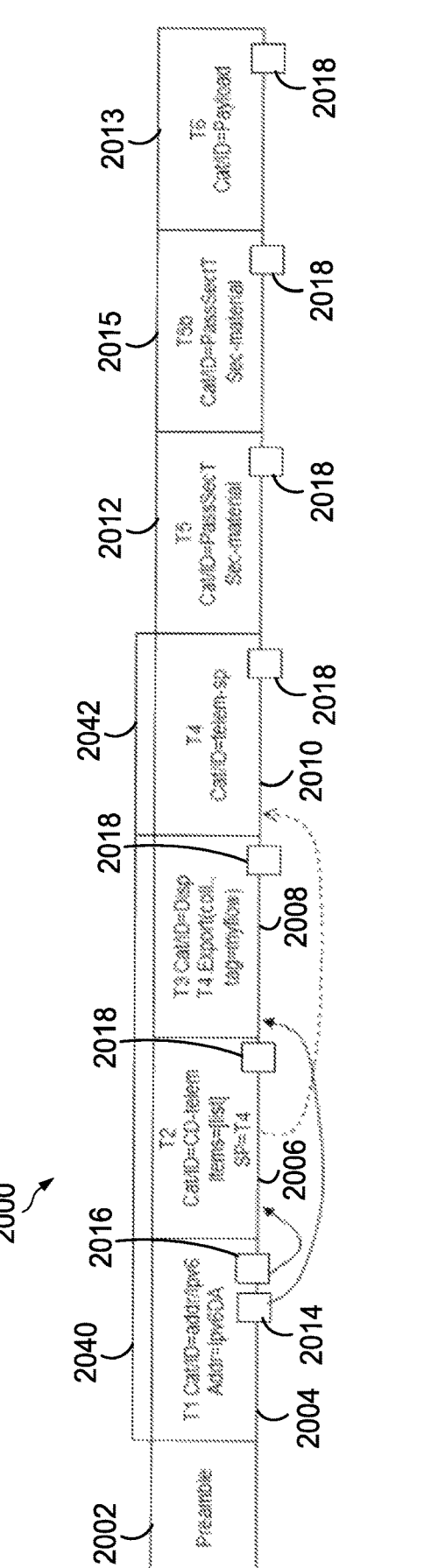
FIG. 20 illustrates an embodiment of processing token cells in a packet in serial fashion utilizing the signature concept.

FIG. 20 illustrates an embodiment of processing token cells in a packet 2000 in serial fashion utilizing the signature concept. The packet 2000 may be processed by a node (e.g., internal node 104) in a network (e.g., network 100). As shown, the packet 2000 comprises a preamble 2002, a first token cell 2004, a second token cell 2006, a third token cell 2008, a fourth token cell 2010, a first security token cell 2012 (i.e., a fifth token cell), a second security token cell 2015 (i.e., a sixth token cell), and a seventh token cell 2013. In other embodiments, the packet 2000 may include more or fewer token cells.

As shown, the first token cell 2004, the second token cell 2006, and the third token cell 2008 have been authenticated by a first signature 2040. In addition, the fourth token cell 2010 has been authenticated by a second signature 2042. In an embodiment, the first signature 2040 and the second signature 2042 have been applied by different nodes as described herein. In an embodiment, the signature 2040 is referenced by the node processing the packet 2000 to verify the authenticity of the first token cell 2004, the second token cell 2006, and the third token cell 2008. In an embodiment, the signature 2042 is referenced by the node processing the packet 2000 to verify the authenticity of the fourth token cell 2010.

In an embodiment, the first security token cell 2012 carries or includes an identity of the node that generated a signature mask, the signature mask itself, and signature mask material corresponding to the signature 2040. In an embodiment, the second security token cell 2015 carries or includes an identity of the node that generated a signature mask, the signature mask itself, and signature mask material corresponding to the signature 2042.

The preamble 2002 is similar to the preamble 202 in FIG. 2. After the preamble 2002 has been processed by the node, the node processes the first token cell 2004. The first token cell 2004 includes a next token field 2016 pointing to a location of the second token cell 2006. Therefore, the node processes the second token cell 2006 after the first token cell 2004. The second token cell 2006 has a category of CD-telem to signify that telemetry data is to be collected for the listed items. Thus, processing of the second token cell 2006 triggers the collection of the telemetry data.

The second token cell 2006 also includes a scratch pad pointer (e.g., SP=T4). As shown in FIG. 20, the scratchpad pointer (SP) specifies a location of the scratchpad token cell as the fourth token cell 2010. Therefore, the collected telemetry data is stored in the fourth token cell 2010 as writeable metadata. In an embodiment, the writeable metadata stored in the fourth token cell 2010 may be referenced by other nodes when the packet 2000 is processed.

Each of the second token cell 2006 and the fourth token cell 2010 includes a next token field 2018 with the null value signifying that no subsequent token cell to be processed is identified. Therefore, after the telemetry data has been collected and stored, the packet 2000 is forwarded to the next node for further processing.

When the packet 2000 reaches the address identified in the first token cell 2004, the node consults the disposition token cell field 2014. The disposition token cell field 2014 specifies a location of a disposition token cell. In the illustrated example, the disposition token cell field 2014 points to the third token cell 2008. Therefore, after processing the first token cell 2004, the node processes the third token cell 2008.

The third token cell 2008 includes a category/ID of disposition to indicate that the disposition parameters (e.g., Export (coll., tag=myflow) should be carried out by the node. By way of example, the disposition parameters may instruct the node to pop the preamble 2002, the first token cell 2004, the second token cell 2006, and the third token cell 2008 off the packet 2000 and to transmit the fourth token cell 2010 carrying the collected telemetry data, the first security token cell 2012, the second security token cell 2015, and/or the sixth token cell 2013 carrying the payload to another node. In an embodiment, the first security token cell 2012 and the second security token cell 2015 may also be removed from the packet 2000 prior to transmission.

Each of the third token cell 2008, the first security token cell 2012, the second security token cell 2015, and the sixth token cell 2013 includes a next token field 2018 with the null value signifying that no subsequent token cell to be processed is identified. Therefore, after the collected telemetry data and/or the payload have been transmitted, the packet 2000 is forwarded to the next node for further processing.

Figure 21:
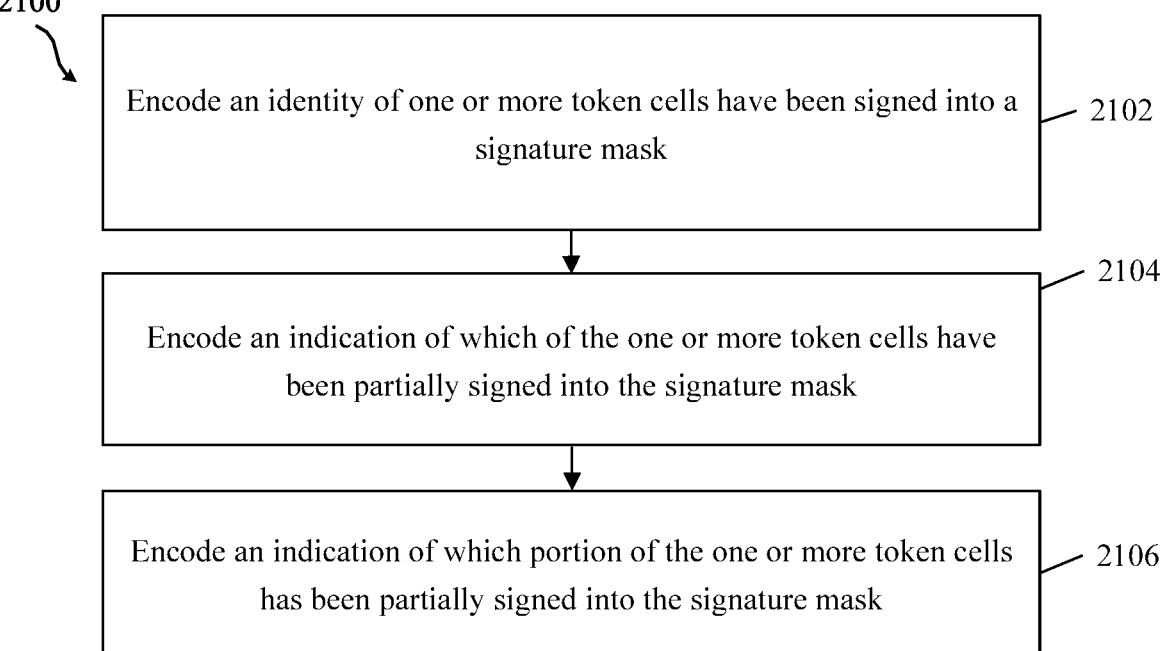
FIG. 21 is a method of providing token security implemented by a network apparatus in a network.

FIG. 21 is a method 2100 of providing token security implemented by a network apparatus (e.g., intermediate network node 104) in a network (e.g., network 100). The method 2100 may be implemented to secure a packet (e.g., packet 300), or portion thereof, being transmitted along a path (e.g., path 112) in the network. In particular, the method 2100 may be implemented in order to facilitate TCR as described herein.

In block 2102, an identity of one or more token cells (e.g., token cells 1604, 1608) that have been signed is encoded into a signature mask (e.g., signature mask 1600). In an embodiment, the identity is provided by setting one or more bits in the signature mask. In block 2104, an indication of which of the one or more token cells have been partially signed is encoded into the signature mask. In an embodiment, the indication is provided by setting one or more bits in the signature mask. In block 2106, an indication of which portion of the one or more token cells has been partially signed is encoded into the signature mask. In an embodiment, the indication is provided by setting one or more bits in the signature mask.

In an embodiment, the method 2100 also includes encoding a position indicator into the signature mask. The position indicator indicates whether a position of the one or more tokens is absolute or relative to a position of the security token cell.

In an embodiment, the method 2100 also includes encoding the identity of the one or more token cells being signed into a first portion of the signature mask, and encoding a next indicator into the signature mask to indicate whether the signature mask contains a second portion containing one or more additional token cells being signed.

In an embodiment, the method 2100 also includes encoding the indication of which of the one or more token cells is being partially signed into a first portion of the signature mask, and encoding a next indicator into the signature mask to indicate whether the signature mask contains a second portion containing one or more additional token cells being partially signed. In an embodiment, the indication of which portion of the one or more token cells is being partially signed identifies one or more octets of the one or more token cells being partially signed.

In an embodiment, the method 2100 also includes storing an identity of a network device generating the signature mask, the signature mask, and signature mask material in a security token cell. In an embodiment, the security token cell is added into the packet immediately following a preamble of the packet. In an embodiment, the signature mask material comprises a security type, a key identifier (ID), and a hash result. In an embodiment, the security token cell is configured to secure a scratchpad token cell. In an embodiment, the method 2100 also includes adding the security token cell to a packet, and transmitting the packet toward another network device.

FIG. 22 is a method 2200 of providing token security implemented by a network apparatus (e.g., intermediate network node 104) in a network (e.g., network 100). The method 2200 may be implemented to secure a packet (e.g., packet 300), or portion thereof, being transmitted along a path (e.g., path 112) in the network. In particular, the method 2200 may be implemented in order to facilitate TCR as described herein.

In block 2202, a packet comprising one or more token cells and a signature mask is received. In block 2204, a first segment of the signature mask is decoded to determine an identity of the one or more token cells in the packet that are signed. In an embodiment, the identity is determined by checking whether one or more bits in the signature mask have been set. In block 2206, a second segment of the signature mask is decoded to determine which of the one or more token cells in the packet are partially signed. In an embodiment, the determination is made by checking whether one or more bits in the signature mask have been set. In block 2208, a third segment of the signature mask is decoded to determine which portion of the one or more token cells in the packet are partially signed. In an embodiment, the determination is made by checking whether one or more bits in the signature mask have been set.

In an embodiment, the packet further comprises a security token cell including an identity of a network device that generated the signature mask, the signature mask, and signature mask material, the signature mask material comprising a security type, a key identifier (ID), and a hash result. In an embodiment, the signature mask comprises a position indicator indicating whether a position of the one or more tokens is absolute or relative to a position of the security token cell.

In an embodiment, the method 2200 further comprises decoding the identity of the one or more token cells that are signed from a first portion of the signature mask, and decoding a next indicator from the signature mask to indicate whether the signature mask contains a second portion containing one or more additional token cells that are signed.

In an embodiment, the method 2200 further comprises decoding the indication of which of the one or more token cells that are partially signed from a first portion of the signature mask, and decoding a next indicator from the signature mask to indicate whether the signature mask contains a second portion containing one or more additional token cells that are partially signed.

In an embodiment, the indication of which portion of the one or more token cells is being partially signed identifies one or more octets of the one or more token cells is being partially signed. In an embodiment, the security token cell immediately follows a preamble of the packet.

A contract clause indicates to nodes that a directive (a.k.a., an action), which may be defined in the packet, should be taken when a condition defined in the contract clause occurs. This allows for control functionality to be implemented in data plane signaling.

Contract clauses, which may also be referred to as packet contracts, are included as a component of packets. The contract clauses are intended to provide processing guidance for nodes encountered along a path. The contract clauses indicate any special processing needed for the packet, for example to apply special QoS algorithms, apply service level assurance operations, select paths based on certain conditions, and so on. Contract clauses generally have an "end-to-end" scope. That is, they are processed by every node across the path.

Contract clauses generally include a set of artifacts, such as conditional directives or rules. Each of those artifacts includes of a set of directives to be executed when a set of conditions specified as part of the same directive/rule holds. A contract clause can include one or more artifacts, depending on the complexity of the intended application and on the number of use cases to be supported in parallel. While powerful, one issue concerns the fact that contract clauses are difficult to support at line rate (e.g., 10 gigabytes per second (GB/s)) by existing hardware technology. The number as well as the nature of conditions and actions can result in a highly variable number of processing cycles needed to process a packet, which makes mapping the processing of contracts to packet processing pipelines challenging. In addition, some use cases call for some contract artifacts to only be applied to certain segments, or nodes. This is difficult to accommodate and results in inefficiencies (e.g., such as the need to introduce additional conditions, adding to packet overhead and processing load).

Figure 23:
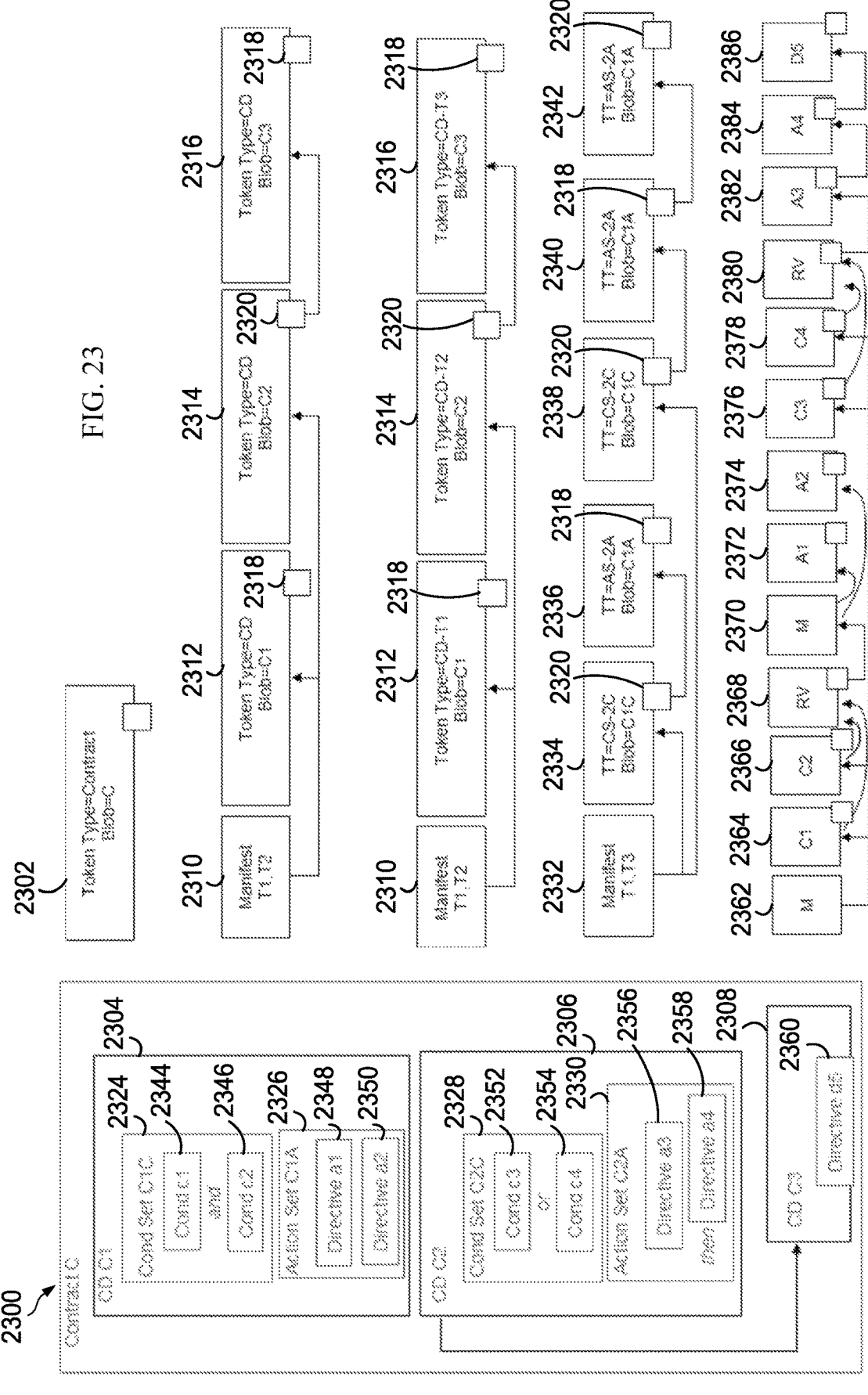
FIG. 23 illustrates an embodiment of utilizing token cells to represent a contract clause in a packet.

FIG. 23 illustrates an embodiment of utilizing token cells to represent a contract clause 2300 in a packet (e.g., packet 200 in FIG. 2). The packet containing the contract clause may be processed by a node (e.g., internal node 104) in a network (e.g., network 100). The contract clause 2300 may be entirely represented in a token cell 2302 having a token type of contract and an ID specifying that the contract clause resides in the blob of the token cell.

The contract clause 2300 includes a first conditional directive 2304, a second conditional directive 2306, and a third conditional directive 2308. The first conditional directive 2304 and the second conditional directive 2306 are configured to be performed in parallel. The third conditional directive 2308 is configured to be performed in serial after the second conditional directive 2306. Therefore, the first conditional directive 2304, the second conditional directive 2306, and the third conditional directive 2308 may be represented by a manifest token cell 2310, token cell 2312, token cell 2314, and token cell 2316.

In an embodiment, manifest token cell 2310 includes one or more pointers (e.g., T1, T2) specifying that the token cell 2312 and the token cell 2314 are to be processed in parallel. The token cell 2312 includes a next token cell field 2318 with a null value. The token cell 2314 includes a next token cell field 2320 specifying the location of the token cell 2316 so that the token cell 2316 is processed in serial after the token cell 2314. The token cell 2316 includes a next token cell field 2318 with a null value.

As shown, the token cell 2312, the token cell 2314, and the token cell 2316 all include the same token cell type of conditional directive (CD). The token cell 2312 includes an ID specifying that the first conditional directive 2304 resides in the blob of the token cell 2312. The token cell 2314 includes an ID specifying that the second conditional directive 2306 resides in the blob of the token cell 2314. The token cell 2316 includes an ID specifying that the third conditional directive 2308 resides in the blob of the token cell 2316.

In an embodiment, the token cell 2312, the token cell 2314, and the token cell 2316 can each include a different token cell type of CD. For example, the different token cells can be differentiated by rule and/or CD template (CD-T). For example, the token cell 2312 can include a token type of CD-T1, the token cell 2314 can include a token type of CD-T2, and the token cell 2316 can include a token type of CD-T3.

The first conditional directive 2304 comprises a first condition set 2324 and a first action set 2326. Whether the first action set 2326 is performed or not depends on a result of the first condition set 2324. The second conditional directive 2306 comprises a second condition set 2328 and a second action set 2330. Whether the second action set 2330 is performed or not depends on a result of the second condition set 2328. Therefore, the first condition set 2324, the first action set 2326, the second condition set 2328, the second action set 2330, and the third conditional directive 2308 may be represented by a manifest token cell 2332, token cell 2334, token cell 2336, token cell 2338, token cell 2340, and token cell 2342.

In an embodiment, the manifest token cell 2332 includes one or more pointers (e.g., T1, T3) specifying that the token cell 2334 and the token cell 2338 are to be processed in parallel. The token cell 2334 includes a next token cell field 2320 specifying the location of the token cell 2336 so that the token cell 2336 is processed in serial after the token cell 2334. The token cell 2336 includes a next token field 2318 with a null value. The token cell 2338 includes a next token cell field 2320 specifying the location of the token cell 2340 so that the token cell 2340 is processed in serial after the token cell 2338. The token cell 2340 includes a next token field 2318 specifying the location of the token cell 2342 so that the token cell 2342 is processed in serial after the token cell 2340. The token cell 2342 includes a next token cell field 2320 with a null value.

The first condition set 2324 comprises a first condition 2344 and a second condition 2346. The first action set 2326 comprises a first directive 2348 and a second directive 2350. The second condition set 2328 comprises a third condition 2352 and a fourth condition 2354. The second action set 2330 comprises a third directive 2356 and a fourth directive 2358. The third conditional directive 2308 comprises a fifth directive 2360.

When both the first condition 2344 and the second condition 2346 are true, then the first action set 2326 is performed. When the first action set 2326 is performed, both the first directive 2348 and the second directive 2350 are performed. When either the first condition 2344 or the second condition 2346 is not true, then the first action set 2326 is not performed.

When either the third condition 2352 or the fourth condition 2354 is true, then the second action set 2330 is performed. When the second action set 2330 is performed, the third directive 2356 is performed and then the fourth directive 2338 is performed. When both the third condition 2352 and the fourth condition 2354 are not true, then the second action set 2330 is not performed.

Based on the foregoing, the first condition 2344, the second condition 2346, the first directive 2348, the second directive 2350, the third condition 2352, the fourth condition 2354, the third directive 2356, the fourth directive 2338, and the fifth directive 2360 may be represented by a manifest token cell 2362, token cell 2364, token cell 2366, rendezvous token cell 2368, manifest token cell 2370, token cell 2372, token cell 2374, token cell 2376, token cell 2378, rendezvous token cell 2380, token cell 2382, token cell 2384, and token cell 2386.

In an embodiment, the manifest token cell 2362 includes one or more pointers (not shown) specifying that the token cell 2364, the token cell 2366, the token cell 2376, and the token cell 2378 are to be processed in parallel. The token cell 2364 includes a next token cell field (identified by a small square) specifying the location of the rendezvous token cell 2368. Likewise, the token cell 2366 includes a next token cell field specifying the location of the rendezvous token cell 2368. Therefore, the results of processing the token cell 2364 and the token cell 2366 are provided to the rendezvous token cell 2368.

The rendezvous token cell 2368 includes a next token cell field specifying the location of the manifest token cell 2370. The manifest token cell 2370 includes one or more pointers specifying that the token cell 2372 and the token cell 2374 are to be processed in parallel. Each of the token cell 2372 and the token cell 2374 includes a next token cell field with a null value.

The token cell 2376 includes a next token cell field specifying the location of the rendezvous token cell 2380. Likewise, the token cell 2378 includes a next token cell field specifying the location of the rendezvous token cell 2380. Therefore, the results of processing the token cell 2376 and the token cell 2378 are provided to the rendezvous token cell 2380.

The rendezvous token cell 2380 includes a next token cell field specifying the location of the token cell 2382. Therefore, the token cell 2382 is processed in serial after the rendezvous token cell 2380. The token cell 2382 includes a next token cell field specifying the location of the token cell 2384. Therefore, the token cell 2384 is processed in serial after the token cell 2382. Finally, token cell 2384 includes a next token cell field specifying the location of the token cell 2386. Therefore, the token cell 2386 is processed in serial after the token cell 2384.

Notably, the contract clause 2300 may be considered to represent seventeen different artifacts. Those artifacts are the contract clause 2300, the first conditional directive 2304, the second conditional directive 2306, the third conditional directive 2308, the first condition set 2324, the first action set 2326, the second condition set 2328, the second action set 2330, the first condition 2344, the second condition 2346, the first directive 2348, the second directive 2350, the third condition 2352, the fourth condition 2354, the third directive 2356, the fourth directive 2358, and the fifth directive 2360.

Using the TCR concepts disclosed herein, the seventeen different artifacts can be represented by nine atomic token cells plus four additional token cells when the contract clause 2300 is fully decomposed. The nine atomic token cells are token cell 2364, token cell 2366, token cell 2372, token cell 2374, token cell 2378, token cell 2382, token cell 2384, and token cell 2386. The four additional token cells, which provide for optimized processing flow, are token cell 2362, token cell 2368, token cell 2370, and token cell 2380. This decomposition of the various conditional directives in the packet can facilitate the processing of the packet by a node, by allowing the node to predict the processing time required according to the number and types of tokens present.

Figure 24:
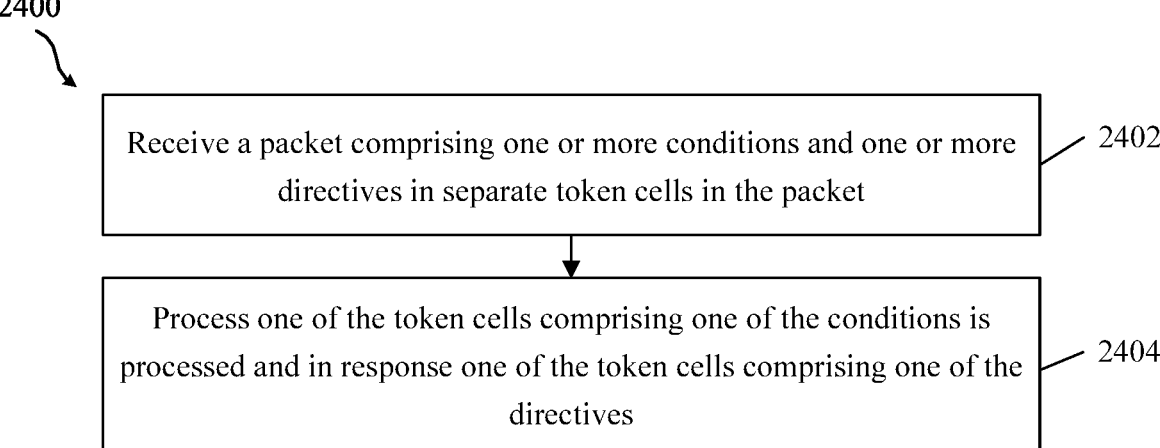
FIG. 24 is a method of packet processing implemented by a network apparatus in a network.

FIG. 24 is a method 2400 of packet processing implemented by a network apparatus (e.g., intermediate network node 104) in a network (e.g., network 100). The method 2400 may be implemented to process a packet (e.g., packet 300), or portion thereof, being transmitted along a path (e.g., path 112) in the network. In particular, the method 2400 may be implemented in order to facilitate TCR as described herein.

In block 2402, a packet comprising one or more conditions and one or more directives in separate token cells in the packet is received. In block 2404, one of the token cells comprising one of the conditions is processed and in response one of the token cells comprising one of the directives is processed.

In an embodiment, the method further comprises processing one of the token cells comprising one of the directives that is not in response to first processing one of the token cells comprising one of the conditions. In an embodiment, the directives processed in response to the processing of one of the conditions comprise actions.

Figure 25:
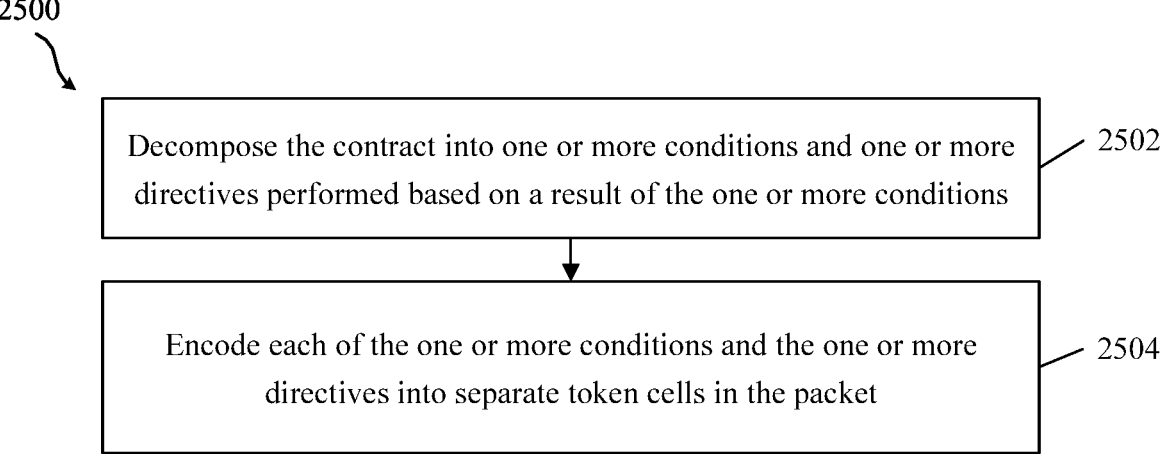
FIG. 25 is a method of packet processing implemented by a network apparatus in a network.

FIG. 25 is a method 2500 of packet processing implemented by a network apparatus (e.g., intermediate network node 104) in a network (e.g., network 100). The method 2500 may be implemented to process a packet (e.g., packet 300), or portion thereof, being transmitted along a path (e.g., path 112) in the network. In particular, the method 2500 may be implemented in order to facilitate TCR as described herein.

In block 2502, the contract is decomposed into one or more conditions and one or more directives performed based on a result of the one or more conditions. In block 2504, each of the one or more conditions and the one or more directives are encoded into separate token cells in the packet.

Figure 26:
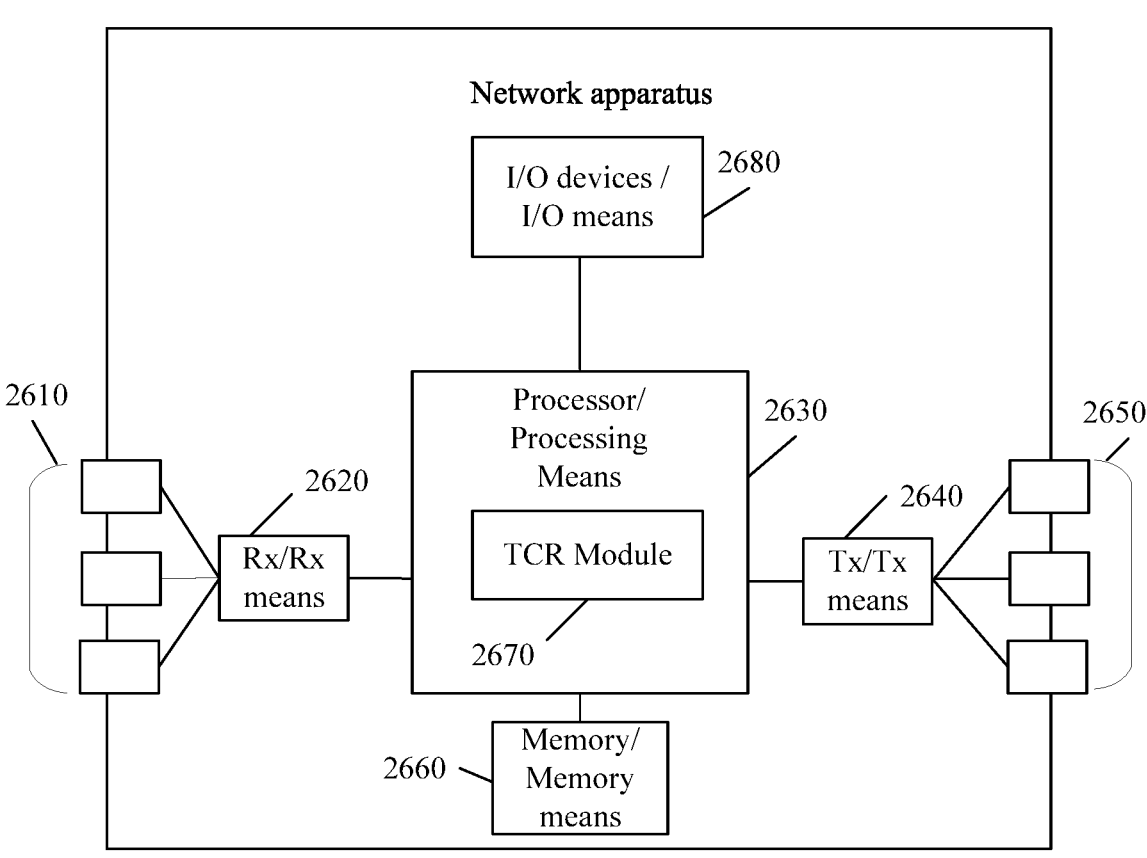
FIG. 26 is a schematic diagram of an network apparatus.

FIG. 26 is a schematic diagram of a network apparatus 2600 (e.g., an edge node 102, the internal node 104, the source 108, or the destination 110). The network apparatus 2600 is suitable for implementing the disclosed embodiments as described herein. The network apparatus 2600 comprises ingress ports/ingress means 2610 and receiver units (Rx)/receiving means 2620 for receiving data; a processor, logic unit, or central processing unit (CPU)/processing means 2630 to process the data; transmitter units (Tx)/transmitting means 2640 and egress ports/egress means 2650 for transmitting the data; and a memory/memory means 2660 for storing the data. The network apparatus 2600 may also comprise optical-to-electrical (OE) components and electrical-to-optical (EO) components coupled to the ingress ports/ingress means 2610, the receiver units/receiving means 2620, the transmitter units/transmitting means 2640, and the egress ports/egress means 2650 for egress or ingress of optical or electrical signals.

The processor/processing means 2630 is implemented by hardware and software. The processor/processing means 2630 may be implemented as one or more CPU chips, cores (e.g., as a multi-core processor), field-programmable gate arrays (FPGAs), application specific integrated circuits (ASICs), and digital signal processors (DSPs). The processor/processing means 2630 is in communication with the ingress ports/ingress means 2610, receiver units/receiving means 2620, transmitter units/transmitting means 2640, egress ports/egress means 2650, and memory/memory means 2660. The processor/processing means 2630 comprises a TCR module 2670. The TCR module 2670 is able to implement the methods disclosed herein. The inclusion of the TCR module 2670 therefore provides a substantial improvement to the functionality of the network apparatus 2600 and effects a transformation of the network apparatus 2600 to a different state. Alternatively, the TCR module 2670 is implemented as instructions stored in the memory/memory means 2660 and executed by the processor/processing means 2630.

The network apparatus 2600 may also include input and/or output (I/O) devices/I/O means 2680 for communicating data to and from a user. The I/O devices I/O means 2680 may include output devices such as a display for displaying video data, speakers for outputting audio data, etc. The I/O devices I/O means 2680 may also include input devices, such as a keyboard, mouse, trackball, etc., and/or corresponding interfaces for interacting with such output devices.

The memory/memory means 2660 comprises one or more disks, tape drives, and solid-state drives and may be used as an over-flow data storage device, to store programs when such programs are selected for execution, and to store instructions and data that are read during program execution. The memory/memory means 2660 may be volatile and/or non-volatile and may be read-only memory (ROM), random access memory (RAM), ternary content-addressable memory (TCAM), and/or static random-access memory (SRAM).

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method of providing token security implemented by a network device in a network, comprising:
   encoding, into a signature mask, an identity of one or more token cells that have been signed;
   encoding, into the signature mask, an indication of which of the one or more token cells have been partially signed; and
   encoding, into the signature mask, an indication of which portion of the one or more partially signed token cells have been signed, wherein the indication of which portion identifies one or more octets of the one or more token cells being partially signed;
   storing an identity of the network device generating the signature mask, the signature mask, and signature mask material in a security token cell, the signature mask material comprising a security type, a key identifier (ID), and a hash result; and
   adding the security token cell to a packet, and transmitting the packet toward another network device.

2. The method of claim 1, further comprising encoding a position indicator into the signature mask, the position indicator indicating whether a position of the one or more token cells is absolute or relative to a position of the security token cell.

3. The method of claim 1, further comprising encoding the identity of the one or more token cells being signed into a first portion of the signature mask, and encoding a next indicator into the signature mask to indicate whether the signature mask contains a second portion containing one or more additional token cells being signed.

4. The method of claim 1, further comprising encoding the indication of which of the one or more token cells is being partially signed into a first portion of the signature mask, and encoding a next indicator into the signature mask to indicate whether the signature mask contains a second portion containing one or more additional token cells being partially signed.

5. The method of claim 1, wherein the security token cell is configured to secure a scratchpad token cell.

6. An apparatus in a network and configured to implement token-based networking, comprising:
   a memory storing instructions; and
   at least one processor in communication with the memory, the at least one processor configured, upon execution of the instructions, to perform the following steps:
   encode, into a signature mask, an identity of one or more token cells that have been signed;
   encode, into the signature mask, an indication of which of the one or more token cells have been partially signed; and
   encode, into the signature mask, an indication of which portion of the one or more token cells have been partially signed, wherein the indication of which portion identifies one or more octets of the one or more token cells being partially signed;
   storing an identity of the apparatus generating the signature mask, the signature mask, and signature mask material in a security token cell, the signature mask material comprising a security type, a key identifier (ID), and a hash result; and
   adding the security token cell to a packet, and transmitting the packet toward another network device.

7. The apparatus of claim 6, wherein the at least one processor is further configured to encode a position indicator into the signature mask, the position indicator indicating whether a position of the one or more token cells is absolute or relative to a position of the security token cell.

8. The apparatus of claim 6, wherein the at least one processor is further configured to encode the identity of the one or more token cells being signed into a portion of the signature mask, and encode a next indicator into the signature mask to indicate whether the signature mask contains a second portion containing one or more additional token cells being signed.

9. The apparatus of claim 6, wherein the at least one processor is further configured to encode the indication of which of the one or more token cells is being partially signed into a first portion of the signature mask, and encode a next indicator into the signature mask to indicate whether the signature mask contains a second portion containing one or more additional token cells being partially signed.

10. The apparatus of claim 6, wherein the security token cell is configured to secure a scratchpad token cell.

11. The apparatus of claim 6, the at least one processor further configured, upon execution of the instructions, to perform the following steps:
   receive a packet comprising the one or more token cells and the signature mask;
   decode a first segment of the signature mask to determine an identity of the one or more token cells in the packet that are signed;
   decode a second segment of the signature mask to determine which of the one or more token cells in the packet are partially signed; and
   decode a third segment of the signature mask to determine which portion of the one or more token cells in the packet are partially signed.

12. A method of providing token security implemented by a network device in a network, comprising:
   receiving a packet comprising one or more token cells and a signature mask;
   decoding a first segment of the signature mask to determine an identity of the one or more token cells in the packet that are signed;
   decoding a second segment of the signature mask to determine which of the one or more token cells in the packet are partially signed;
   decoding a third segment of the signature mask to determine which portion of the one or more token cells in the packet are partially signed; and
   verifying a signature of the one or more token cells according to the first segment, the second segment, and the third segment as decoded.

13. The method of claim 12, wherein the packet further comprises a security token cell including an identity of the network device that generated the signature mask, the signature mask, and signature mask material, the signature mask material comprising a security type, a key identifier (ID), and a hash result.

14. The method of claim 13, wherein the signature mask comprises a position indicator indicating whether a position of the one or more token cells is absolute or relative to a position of the security token cell.

15. The method of claim 12, further comprising decoding the identity of the one or more token cells that are signed from a first portion of the signature mask, and decoding a next indicator from the signature mask to indicate whether the signature mask contains a second portion containing one or more additional token cells that are signed.

16. The method of claim 12, further comprising decoding an indication of which of the one or more token cells that are partially signed from a first portion of the signature mask, and decoding a next indicator from the signature mask to indicate whether the signature mask contains a second portion containing one or more additional token cells that are partially signed.

* * * * *